(12) United States Patent
Lei

(10) Patent No.: US 12,720,550 B2
(45) Date of Patent: Aug. 25, 2026

(54) EFFICIENT TRANSMISSION OF CONTROL AND DATA CHANNELS

(71) Applicant: QUALCOMM Incorporated, San Diego, CA (US)

(72) Inventor: Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/788,840

(22) Filed: Jul. 30, 2024

(65) Prior Publication Data

US 2026/0040307 A1 Feb. 5, 2026

(51) Int. Cl.

| | |
|---|---|
| ***H04W 72/20*** | (2023.01) |
| ***H04L 1/00*** | (2006.01) |
| ***H04L 5/00*** | (2006.01) |
| ***H04W 72/044*** | (2023.01) |

(52) U.S. Cl.

CPC ......... *H04W 72/20* (2023.01); *H04W 72/044* (2013.01); *H04L 5/0005* (2013.01)

(58) Field of Classification Search

CPC .... H04W 72/20; H04W 72/044; H04L 5/0005
See application file for complete search history.

(56) References Cited

U.S. PATENT DOCUMENTS

| | | | | |
|---|---|---|---|---|
| 7,418,050 | B1 * | 8/2008 | Gardner | H04B 7/0697 375/265 |
| 2016/0029351 | A1 * | 1/2016 | Shimezawa | H04L 5/0048 370/329 |
| 2018/0049173 | A1 * | 2/2018 | Chen | H04W 76/28 |

* cited by examiner

*Primary Examiner* — Sahar Motazedi
*Assistant Examiner* — Labibah Ilma Ali
(74) *Attorney, Agent, or Firm* — Loza & Loza, LLP

(57) ABSTRACT

An apparatus transmits a multiplexed combination of a control channel and a data channel that is mapped to at least one resource element in a time-frequency resource grid. Before transmission, the apparatus modulates a plurality of coded bits of the control channel using a first modulation scheme to obtain a plurality of control channel symbols, spread the plurality of control channel symbols using a first spreading code to obtain a spread plurality of control channel symbols, modulates a plurality of coded bits of the data channel using a second modulation scheme to obtain a plurality of data channel symbols, spread the plurality of data channel symbols using a second spreading code to obtain a spread plurality of data channel symbols, and multiplexes the spread plurality of control channel symbols with the spread plurality of data channel symbols to obtain the multiplexed combination of the control channel and the data channel.

12 Claims, 14 Drawing Sheets

EFFICIENT TRANSMISSION OF CONTROL AND DATA CHANNELS

TECHNICAL FIELD

This disclosure relates generally to wireless communication, and more specifically, to efficient transmission of control and data channels.

INTRODUCTION

Control channel information and data channel information may be transmitted separately using different channel codings, modulation formats, and radio resources. For dynamic scheduling based on downlink control information (DCI), both a network entity and a user equipment activate multiple baseband (BB) and radio frequency (RF) devices to transmit and receive the control channel information and the data channel information. Some methodologies exist to save power at a user equipment or a network entity; however, further research is required in power efficiency and spectral efficiency to foster the goals of improved overall efficiency of future communication systems.

BRIEF SUMMARY OF SOME EXAMPLES

The systems, methods, and devices of this disclosure each have several innovative aspects, no single one of which is solely responsible for the desirable attributes disclosed herein.

In one example, an apparatus is disclosed. The apparatus includes one or more memories and one or more processors. The one or more processors are configured to, individually or collectively, based at least in part on information stored in the one or more memories: transmit a multiplexed combination of a control channel and a data channel, the multiplexed combination is mapped to at least one resource element in a time-frequency resource grid.

In one example a method at an apparatus is disclosed. The method includes transmitting a multiplexed combination of a control channel and a data channel, the multiplexed combination is mapped to at least one resource element in a time-frequency resource grid.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
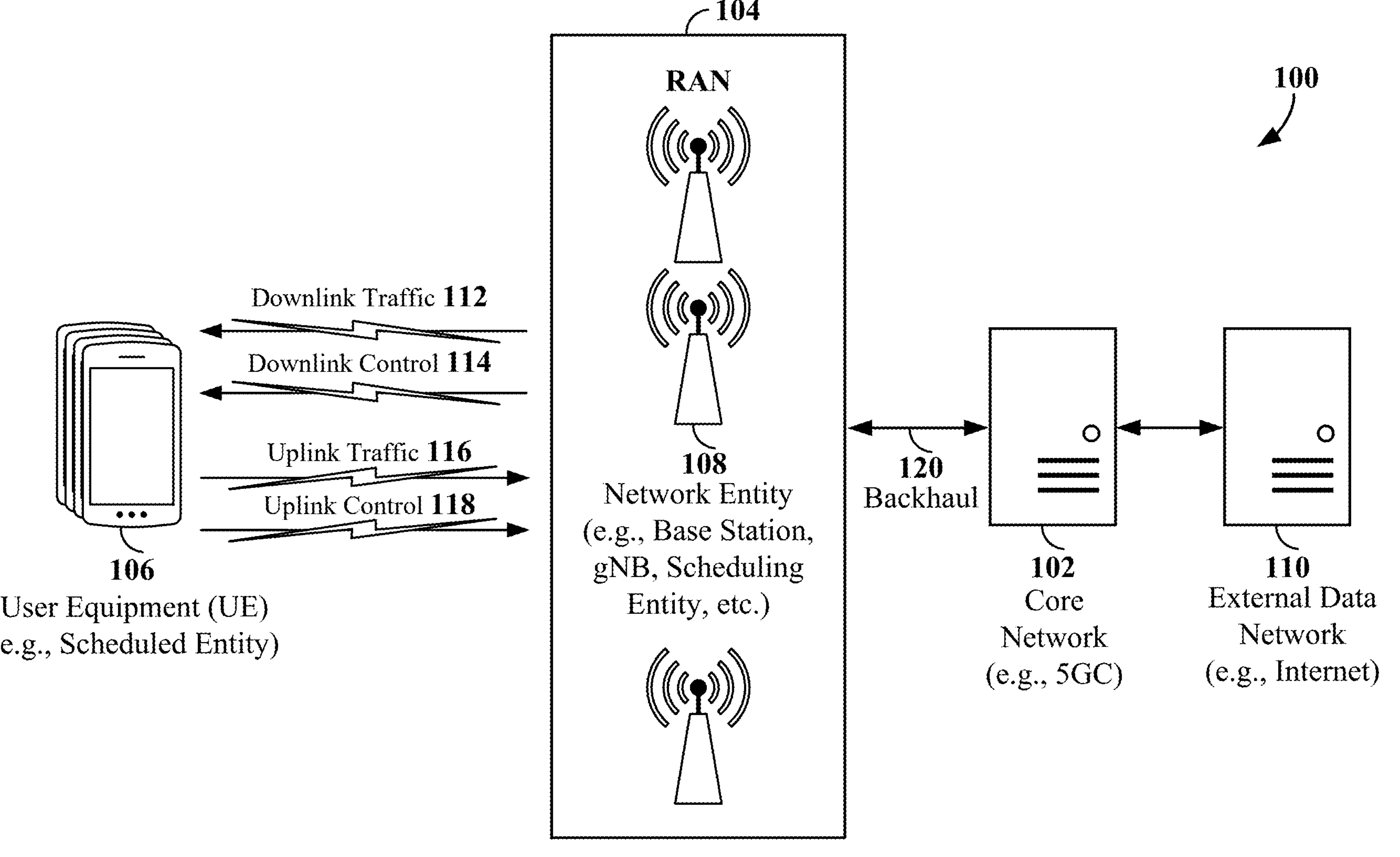
FIG. 1 is a schematic illustration of an example of a wireless communication system according to some aspects of the disclosure.

The detailed description set forth below in connection with the appended drawings is directed to some particular examples for the purpose of describing innovative aspects of this disclosure. However, a person having ordinary skill in the art will readily recognize that the teachings herein can be applied in a multitude of different ways. Some or all of the described examples may be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described examples can be implemented in any device, system, or network that is capable of transmitting and receiving RF signals according to, but not limited to, one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple input multiple output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to persons having ordinary skill in the art that these concepts may be practiced without these specific details. In some examples, well-known structures and components are shown in block diagram form in order to avoid obscuring such concepts.

While aspects and examples are described in this application by illustration to some examples, persons having ordinary skill in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are techniques associated with the transmission and reception of a signal that includes a superposition of a control channel (e.g., a PDCCH or a PUCCH) and a data channel (e.g., a PDSCH or a PUSCH) based on symbol-level spreading and/or hierarchical modulation based on constellation scaling and/or rotation. The superimposed control channel and data channel may be associated with one user and may be mapped to at least one resource element (RE) in a time-frequency resource grid, such as the OFDM resource grid 404, as shown and described in connection with FIG. 4.

The various concepts presented throughout this disclosure may be implemented across a broad variety of telecommunication systems, network architectures, and communication standards. Referring now to FIG. 1, as an illustrative example without limitation, a schematic illustration of an example of a wireless communication system 100 according to some aspects of the disclosure is presented. The wireless communication system 100 includes three interacting domains: a core network 102, a radio access network (RAN) 104, and a user equipment (UE) 106 (e.g., of a plurality of UEs). By virtue of the wireless communication system 100, the UE 106 (also referred to herein as a wireless communication device or an apparatus) may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (CUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108. Broadly, a network entity may be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some examples, a network entity may be a network element in a radio access network responsible for radio transmission and reception in one or more cells to or from a UE. In different technologies, standards, or contexts, a network entity may variously be referred to by persons having ordinary skill in the art as a base transceiver station (BTS), a radio base station, a base station, a radio transceiver, a transceiver function, a basic service set (BSS), an extended service set (ESS), an access point (AP), a Node B (NB), an eNode B (cNB), a gNode B (gNB), a transmission and reception point (TRP), a scheduling entity, a network access point, or some other suitable terminology. In some examples, a network entity 108 may include two or more TRPs that may be collocated or non-collocated. Each TRP may communicate on the same or different carrier frequency within the same or different frequency band. In examples where the RAN 104 operates according to both the LTE and 5G NR standards, one of the network entities may be an LTE network entity, while another network entity may be a 5G NR network entity.

The RAN 104 is further illustrated supporting wireless communication for multiple mobile apparatuses, one of which may be identified as UE 106. A mobile apparatus may be referred to as user equipment (UE) in 3GPP standards, but may also be referred to by persons having ordinary skill in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, a scheduled entity, or some other suitable terminology. The UE 106 may be an apparatus (e.g., a mobile apparatus, a wireless communication device) that provides a user with access to network services.

Within the present disclosure, a “mobile” apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an “Internet of Things” (IoT).

A mobile apparatus (e.g., UE 106) may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data and/or relevant QoS for transport of critical service data.

Wireless communication between the RAN 104 and the UE 106 may be described as utilizing an air interface. Transmissions over the air interface from a network entity (e.g., similar to network entity 108) to one or more UEs (e.g., similar to UE 106) may be referred to as downlink (DL) transmission. In accordance with certain aspects of the present disclosure, the term downlink may refer to a point-to-multipoint transmission or a point-to-point transmission (e.g., groupcast, multicast, or unicast) originating at a network entity (e.g., network entity 108). Another way to describe this scheme may be to use the term broadcast channel multiplexing. Transmissions from a UE (e.g., UE 106) to a network entity (e.g., network entity 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a network entity (e.g., a network entity 108) allocates resources for communication among some or all devices and equipment within its service area or cell. Within the present disclosure, as discussed further below, the network entity (e.g., network entity 108) may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the network entity 108.

Network entities 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, the network entity 108 may broadcast downlink traffic 112 (also referred to as downlink data traffic) to one or more UEs 106. Broadly, the network entity 108 may be a node or device responsible for scheduling traffic (e.g., data traffic, user data traffic) in a wireless communication network, including the downlink traffic 112 and, in some examples, uplink traffic 116 (also referred to as uplink data traffic) from one or more UEs 106 to the network entity 108. On the other hand, the UE 106 (e.g., the scheduled entity) may be a node or device that receives downlink control 114 information, including but not limited to scheduling information (e.g., a grant), synchronization or timing information, or other control information from another entity in the wireless communication network such as the network entity 108. The UE 106 may further transmit uplink control 118 information, including but not limited to a scheduling request or feedback information, or other control information to the network entity 108.

In addition, the uplink control 118 information and/or downlink control 114 information and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, the network entity 108 may include a backhaul interface (not shown) for communication with a backhaul portion 120 of the wireless communication system 100. The backhaul portion 120 may provide a link between a network entity 108 and the core network 102. Further, in some examples, a backhaul network may provide interconnection between respective network entities 108. Various types of backhaul interfaces may be employed, such as a direct physical connection, a virtual network, or the like using any suitable transport network.

The core network 102 may be a part of the wireless communication system 100 and may be independent of the radio access technology (RAT) used in the RAN 104. In some examples, the core network 102 may be configured according to 5G standards (e.g., 5G core (5GC)). In other examples, the core network 102 may be configured according to a 4G evolved packet core (EPC) or any other suitable standard or configuration.

Figure 2:
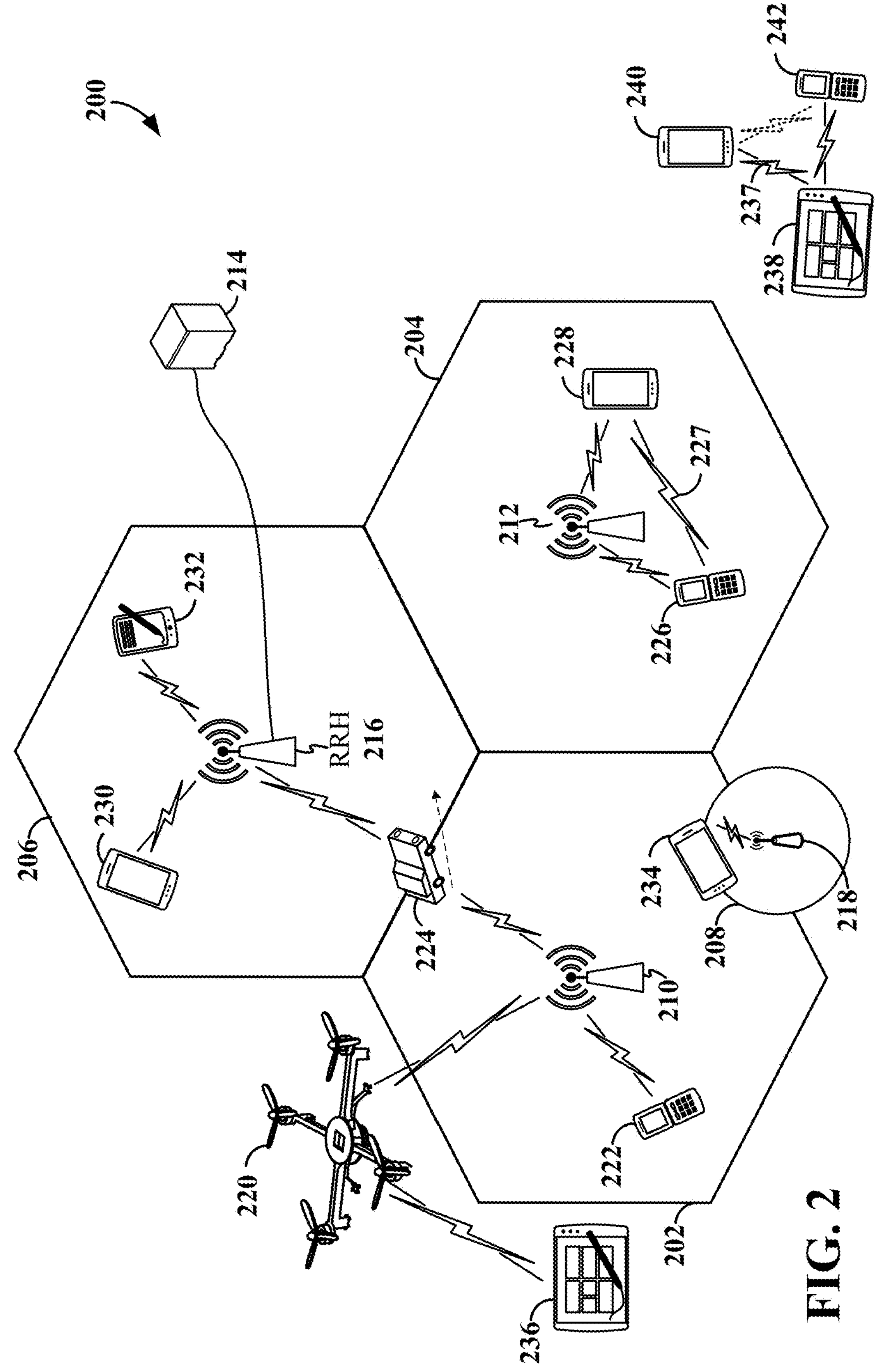
FIG. 2 is a schematic illustration of an example of a radio access network according to some aspects of the disclosure.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or network entity. FIG. 2 illustrates cells 202, 204, 206, and 208, each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas, with each antenna responsible for communication with UEs in a portion of the cell.

Various network entity arrangements can be utilized. For example, in FIG. 2, two network entities, referred to as base station 210 and base station 212, are shown in cells 202 and 204. A third network entity, referred to as base station 214, is shown controlling a remote radio head (RRH) 216 in cell 206. That is, a network entity can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of network entities (e.g., base stations, gNBs, TRPs, scheduling entities) and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the network entity 108 described above and illustrated in FIG. 1.

FIG. 2 further includes an unmanned aerial vehicle (UAV) 220, which may be a drone, quadcopter, octocopter, etc. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as or similar to the one or more UEs 106 described above and illustrated in FIG. 1. In some examples, the UAV 220 may be a mobile network entity and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station (e.g., a network entity). In other examples, two or more UEs (e.g., UEs 226 and 228) within the coverage area of a network entity (e.g., base station 212) may also communicate sidelink signals 227 over a direct link (sidelink) without conveying that communication through the network entity (e.g., base station 212). In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. The exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of network entities and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication.

The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a network entity (e.g., an aggregated or disaggregated base station, gNB, eNB, TRP, scheduling entity, etc.), or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell (e.g., cell 202) to the geographic area corresponding to a neighbor cell (e.g., cell 206). When the signal strength or quality from the neighbor cell exceeds that of its serving cell for a given amount of time, the UE 224 may transmit a reporting message to its serving network entity (e.g., base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enable the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-

OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as subband full-duplex (SBFD), also known as flexible duplex.

Deployment of communication systems, such as 5G new radio (NR) systems, may be arranged in multiple manners with various components or constituent parts. In a 5G NR system, or network, a network entity, a network entity, a mobility element of a network, a radio access network (RAN) node, a core network entity, a network element, or a network equipment, such as a base station (BS), or one or more units (or one or more components) performing base station functionality, may be implemented in an aggregated or disaggregated architecture. For example, a BS (such as a Node B (NB), evolved NB (cNB), gNB, NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
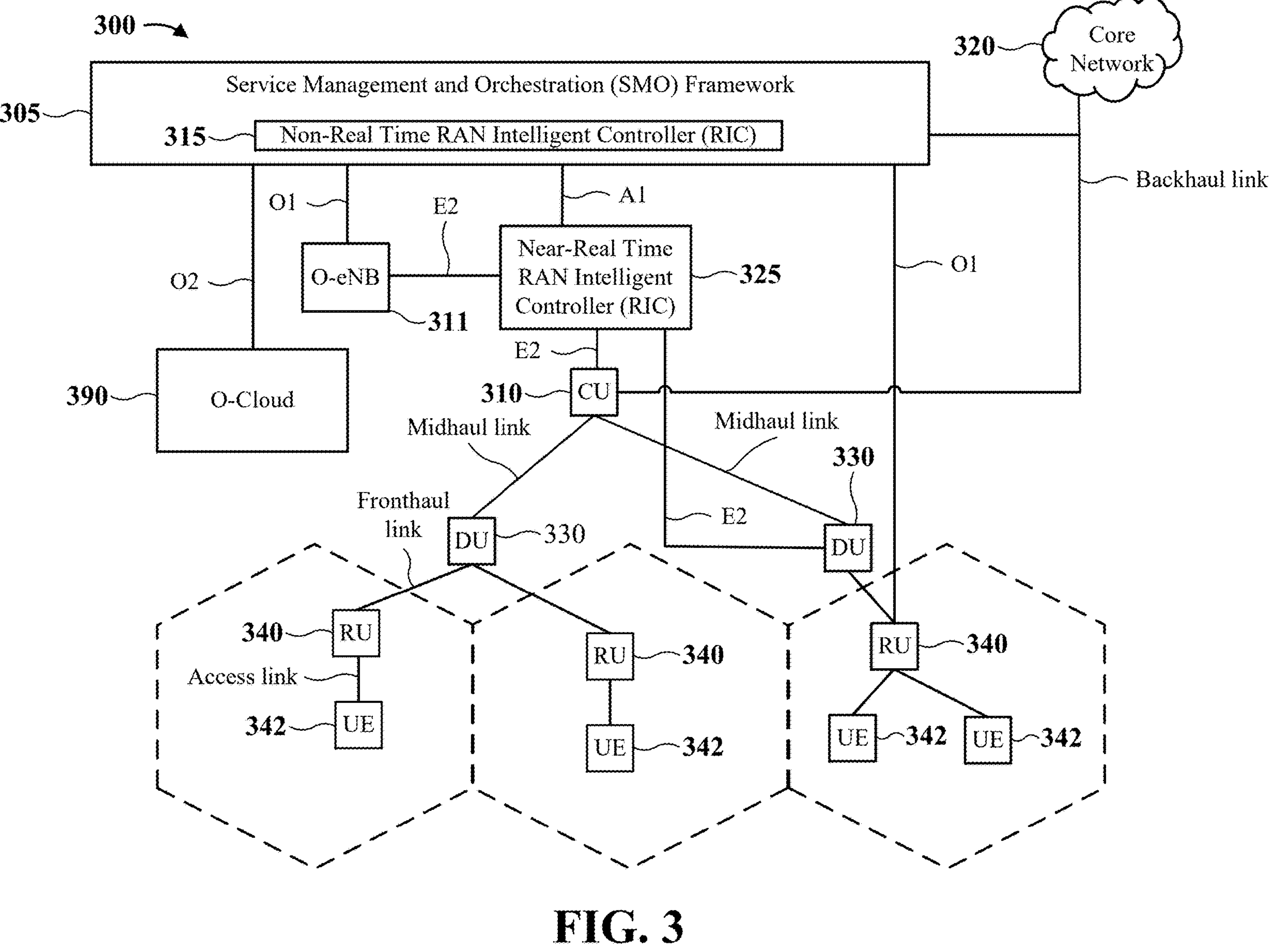
FIG. 3 is a schematic illustration of an example of a disaggregated base station architecture according to some aspects of the disclosure.

FIG. 3 is a schematic illustration of an example disaggregated base station 300 architecture according to some aspects of the disclosure. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 342 via one or more radio frequency (RF) access links. In some implementations, the UE 342 may be simultaneously served by multiple RUs 340. UE 342 may be the same or similar to any of the UEs or scheduled entities illustrated and described in connection with FIG. 1 and FIG. 2, for example.

Each of the units, i.e., the CUS 310, the DUs 330, the RUs 340, as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 342. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 3G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Various aspects of the present disclosure will be described with reference to an OFDM waveform, schematically illustrated in FIG. 4. It should be understood by persons having ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 4:
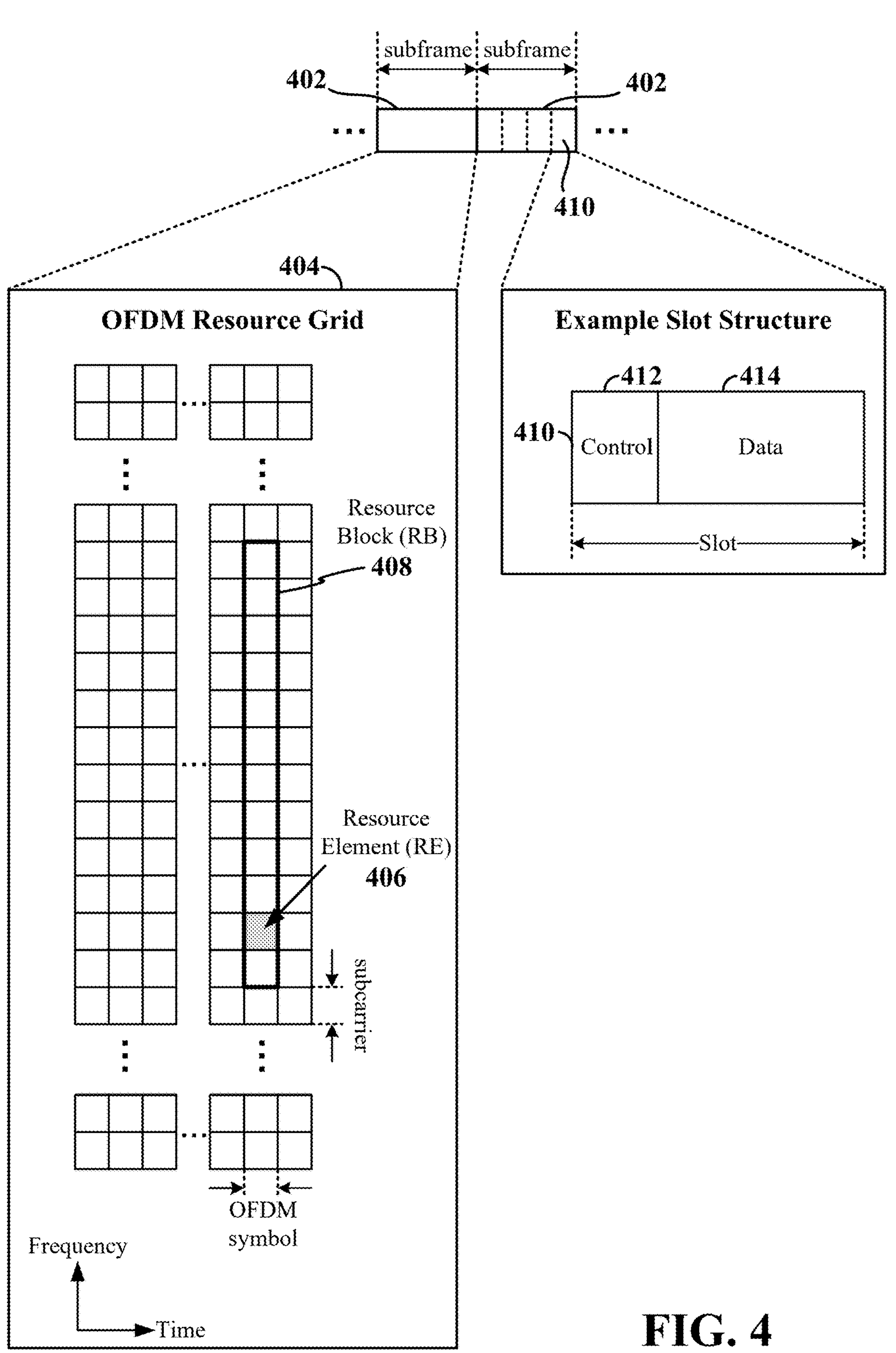
FIG. 4 is an expanded view of an exemplary subframe, showing an orthogonal frequency division multiplexing (OFDM) resource grid according to some aspects of the disclosure.

Referring now to FIG. 4, an expanded view of an exemplary subframe 402 is illustrated, showing an OFDM resource grid (one example of a time-frequency resource grid). However, as persons having ordinary skill in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple input multiple output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain.

A set of continuous or discontinuous resource blocks may be referred to herein as a Resource Block Group (RBG), subband, or bandwidth part (BWP). A set of subbands or BWPs may span the entire bandwidth. Scheduling of wireless communication devices (e.g., V2X devices, sidelink devices, or other UEs, hereinafter generally referred to as UEs) for downlink, uplink, or sidelink transmissions may involve scheduling one or more resource elements 406 within one or more subbands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., an aggregated or disaggregated base station, gNB, eNB, TRP, scheduling entity, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. An additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of slot 410 illustrates that the slot 410 includes a control region 412 and a data region 414. In general, the control region 412 may carry control channels, and the data region 414 may carry data channels. In some examples, a Uu slot (e.g., slot 410) may contain all DL, all UL, or at least one DL portion and at least one UL portion. The structures illustrated in FIG. 4 are merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the network entity may allocate one or more REs 406 (e.g., within the control region 412) of the slot 410 to carry DL control information including one or more DL control channels, such as a physical downlink control channel (PDCCH), to one or more UEs (e.g., scheduled entities). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to persons having ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) of the Uu slot 410 to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 4, 10, 20, 50, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (MSI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the UE (e.g., scheduled entity) may utilize one or more REs 406 of the Uu slot 410 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. In response to the SR transmitted on the UCI, the scheduling entity may transmit downlink control information (DCI) that may schedule resources for uplink packet transmissions. UCI may also include HARQ feedback, channel state feedback (CSF), such as a CSI report, a measurement report (e.g., a Layer 1 (L1) measurement report), or any other suitable UCI.

In addition to control information, one or more REs 406 (e.g., within the data region 414) of the Uu slot 410 may be allocated for data traffic. Such data traffic may be carried on one or more traffic channels, such as, for a DL transmission, a physical downlink shared channel (PDSCH); or for a UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, sidelink medium access control-control elements (MAC CEs) may be transmitted in the data region 414 of the slot 410. In addition, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The physical channels described above are generally multiplexed and mapped to transport channels for handling at the medium access control (MAC) layer. Transport channels carry blocks of information called transport blocks (TB). The transport block size (TBS), which may correspond to a number (e.g., a quantity) of bits of information, may be a controlled parameter based on the modulation and coding scheme (MCS) and the number of RBs in a given transmission.

Figure 5A:
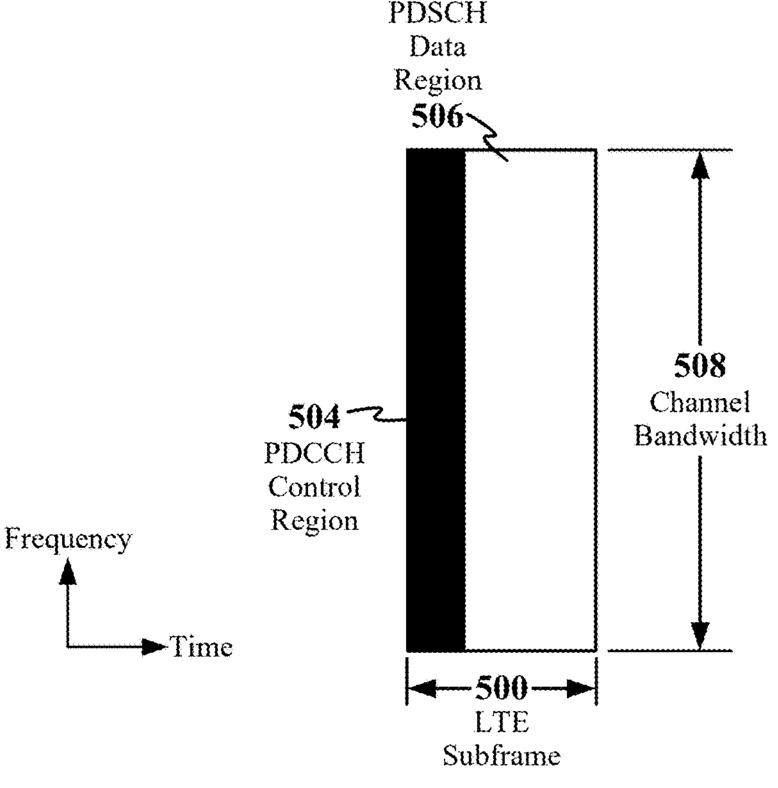
FIGS. 5A and 5B are examples of a 4G LTE subframe and a 5G NR slot according to some aspects of the disclosure.
Figure 5B:
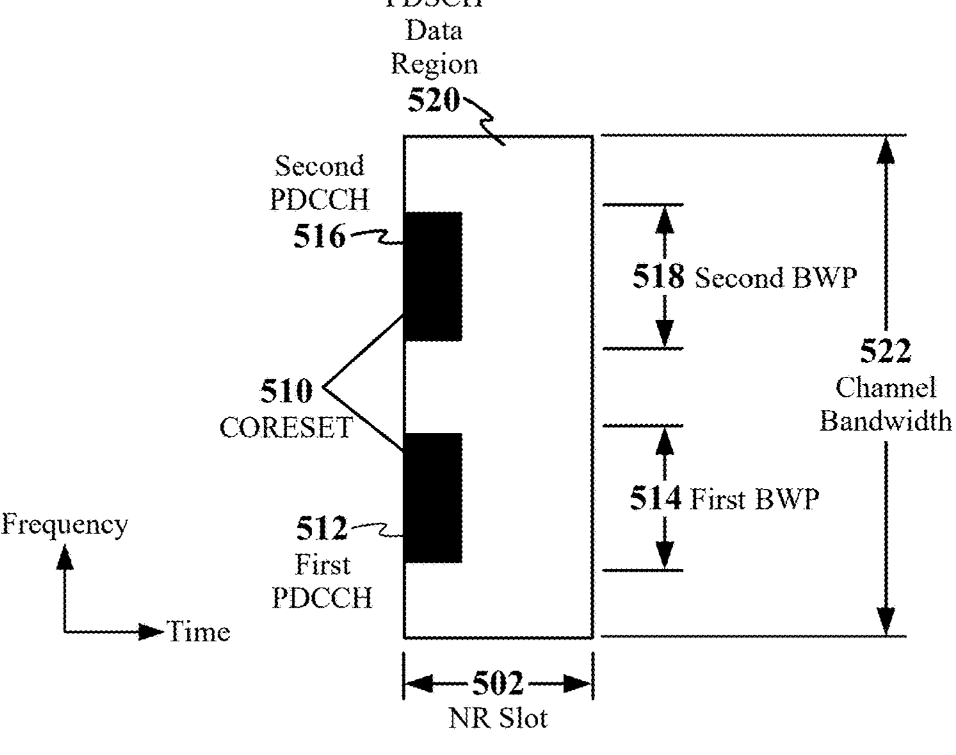

FIGS. 5A and 5B are examples of a 4G LTE subframe 500 and a 5G NR slot 502 according to some aspects of the disclosure. In both FIGS. 5A and 5B, time is in the horizontal direction with units of OFDM symbols; and frequency is in the vertical direction with units of subcarriers of the carrier. These examples are for purposes of discussion and not limitation. In 4G LTE and 5G NR, control channels and data channels are transmitted separately using different channel coding, modulation formats, and radio resources. As shown in the 4G LTE subframe 500 example, a PDCCH control region 504 and a PDSCH data region 506 exist. Each region occupies the full channel bandwidth 508. The PDCCH control region 504 may occupy the first 1, 2, or 3 symbols of the 4G LTE subframe 500. The remaining symbols of the 4G LTE subframe 500 may be used for the PDSCH data region 506. As illustrated in the example of FIG. 5A, the PDCCH control region 504 and the PDSCH data region 506 are transmitted using the same frequency resources at different times (i.e., using different symbols).

As exemplified in the 5G NR slot 502 of FIG. 5B, resource utilization in 5G NR may be more flexible than in 4G LTE. FIG. 5B depicts a 5G NR control resource set (CORESET) 510. The CORESET 510 may be a collection of time-frequency resources on an NR downlink resource grid that can be used to transmit a PDCCH. CORESETs may be made of multiple resource blocks in the frequency domain and one, two, or three OFDM symbols in the time domain. In the CORESET 510 of FIG. 5B, a first PDCCH 512 and a second PDCCH 516 are configured. The first PDCCH 512 occupies a first bandwidth part (BWP) 514. The second PDCCH 516 occupies a second BWP 518. The first BWP 514 and the second BWP 518 are within the channel bandwidth 522 of the example given in FIG. 5B. Only one BWP is active at a given time. Accordingly, even though two BWPs are shown in FIG. 5B, only one is active at any given time, and the PDCCH may only be transmitted when the given BWP is active. Therefore, the first PDCCH 512 is transmitted while the first BWP 514 is active, or the second PDCCH 516 is transmitted while the second BWP 518 is active. The resources not used for the first PDCCH 512 or the second PDCCH 516 may be used as a PDSCH data region 520. As illustrated and explained in the example of FIG. 5B, the first PDCCH 512 and the second PDCCH 516 (data channels) are transmitted using the different frequency resources and (within a given BWP) at different times (i.e., using different symbols) from the PDSCH (data channels).

In both the 4G LTE system and the 5G NR system, in connection with dynamic scheduling based on DCI, for example, both the network and the user equipment rely on multiple baseband (BB) and radio frequency (RF) units to transmit and receive control channel and data channel information. Accordingly, to transmit, receive, and process the control channel and data channel information, each of the network and the user equipment may need to activate multiple BB and RF units.

To achieve power saving for the network and the user equipment, different strategies (e.g., cross-slot scheduling, user equipment and/or cell discontinuous reception (DRX) (i.e., a method to save power by turning off receivers during periods of inactivity), wake-up signal (WUS) (i.e., a power-saving mechanism that reduces a device's resource draw, which can improve battery life and user experience), deactivation/dormancy, on-demand broadcast) have been specified/studied by 3GPP to reduce the ON-duration of transceivers.

The channels and carriers described above in connection with FIGS. 1-5 are not necessarily all of the channels and carriers that may be utilized between devices, and persons having ordinary skill in the art will recognize that other channels or carriers (such as other traffic, control, and feedback channels) may be utilized in addition to those illustrated.

An opportunity may exist to achieve improved power savings and/or higher spectral efficiency in the transmission and reception of data channels and control channels. Specifically, an opportunity may exist to multiplex the PDCCH and the PDSCH together on the downlink and to multiplex the PUCCH and PUSCH together on the uplink. Utilizing this aspect of multiplexing may enable enhanced and new experiences, for example, realized via an increased amount of data and control signals that can be transmitted (and received) between a network and a user equipment in a given time based on the improved temporal and spectral efficiency realized via the multiplexing of data channels and control channels.

Additionally, the multiplexing described herein may lead to improved power (i.e., energy) efficiency realized at both the network and the user equipment sides because transmission (and reception) of data channels and control channels according to aspects described herein may be conducted simultaneously rather than serially. The improved power efficiency may lead to improved environmental impacts (e.g., reduction of energy used in communications) and may hasten positive societal changes. The societal changes may include, for example, faster adoption and widespread use of digital twins (e.g., a digital representation of a real-world object) to model the physical world and continue to derive new values more accurately. The societal changes may include a faster adoption and use of a metaverse to augment the physical world and create a next-level immersive experience. The benefits may extend to economic sustainability and foster the continued growth of a wireless ecosystem to fuel sustained global economic growth. The improved energy efficiency through the system design described herein may represent a humanitarian effort to minimize environmental impact actively and (through greater power/energy efficiency) enable a reduction in greenhouse gas emissions in multiple sectors. Efficiency improvements may lead to decreased prices and an improved possibility of making communication networks, user equipment devices, and supported services more available to the masses. They may, therefore, promote digital equity and inclusion. Consequently, aligning the power/energy efficiency for user equipment and the network is desirable while meeting the ever-growing demands for additional data and communication services.

Multi-user (distinct from single-user) superposition was explored in a technical study of Multi-User Superposition Transmission (MUST). MUST utilized superposition coding for downlink transmissions of multiple users in LTE-Advanced (LTE-A) systems. Multi-user (again, as distinct from single-user) superposition was also explored using non-orthogonal multiple access (NOMA). NOMA utilized superposition coding for uplink transmissions of multiple users in 5G networks. Both MUST and NOMA target multiple users sharing the same spectrum, with a focus on data channels. In MUST and NOMA, multiple users reuse the same radio resources for data. However, the data information (e.g., data messaging) is still transmitted separately from the control information (e.g., control signaling).

Aspects described herein are distinguishable from MUST and NOMA at least because the aspects of superposition described and illustrated herein are directed toward superposition schemes in which a data channel and a control channel are superimposed (in contrast to the MUST and NOMA superposition schemes in which data channels of multiple users are superimposed). MUST and NOMA do not contribute to spectral efficiency in the same way as the aspects described herein because, in the contexts of MUST and NOMA, data channels continue to be transmitted separately from control channels; data channels occupy time and spectral resources that are separate and distinct from the time and spectral resources occupied by control channels.

In contrast, for example, to 4G LTE use of MUST, 5G NR use of NOMA, and 5G NR use of the CORESET BWP designs, according to aspects described herein, a network or user equipment may transmit (and the user equipment or the network may receive) a multiplexed combination of a data channel and a control channel, where the multiplexed combination may be mapped to at least one resource element in a time-frequency resource grid (e.g., the OFDM resource grid 404 as shown and described in connection with FIG. 4). Accordingly, the superposition schemes described herein may improve power/energy and spectral efficiency of a system by superimposing (e.g., by multiplexing) a data channel and a control channel of at least one user. Moreover, in contrast to MUST and NOMA targeting multiple users by multiplexing the use of multiple users on one type of channel (e.g., multiple users on a data channel), aspects described herein may relate to the multiplexing of multiple types of channels (e.g., multiplexing a data channel with a control channel) in association with at least one user.

Compared with time domain multiplexing (TDM) transmission of a data channel and a control channel in systems such as 4G LTE and 5G NR, the aspects described herein may reduce an active time (e.g., an ON-time) of transceivers and thereby save power for the user equipment and the network. The reduced active time may be realized because the transmission or reception of a data channel occurs at the same time as the transmission or reception of a control channel (e.g., aspects described herein relate to simultaneous, as opposed to sequential, operation of at least one data channel and one control channel of at least one user).

Compared with frequency division multiplexing (FDM) transmission of a data channel and a control channel in systems such as 4G LTE and 5G NR, the aspects described herein may achieve higher spectral efficiency and/or enable narrower band operation to reduce sampling rates of transceivers and save power for the user equipment and the network. The higher spectral efficiency and/or narrower band operation may be realized because the transmission or reception of a data channel occurs at the same frequency (e.g., same channel frequency) as the transmission or reception of a control channel (e.g., aspects described herein relate to use of the same subcarriers, as opposed to different subcarriers, for the simultaneous transmission or reception of at least one data channel and one control channel).

According to some aspects described herein, in connection with a downlink, the superimposed control channel and data channel may be unicast to a single UE or multicast/broadcast to a group of UEs. According to some aspects described herein, in connection with an uplink, the superimposed control channel and data channel may replace or supplement a legacy mechanism sometimes referred to as "UCI piggyback on PUSCH" (i.e., referring to a practice of piggybacking uplink control information (UCI) on a PUSCH). In addition to power saving and spectral efficiency improvement, the aspects described herein (e.g., the multiplexing schemes described herein) may be applied to latency-sensitive services. They may enhance the scheduling flexibility of a network with fragmented radio resources in certain coverage bands (e.g., re-farming 4G LTE FDD bands as 5G NR bands in FR1).

Figures 6A, 6B:
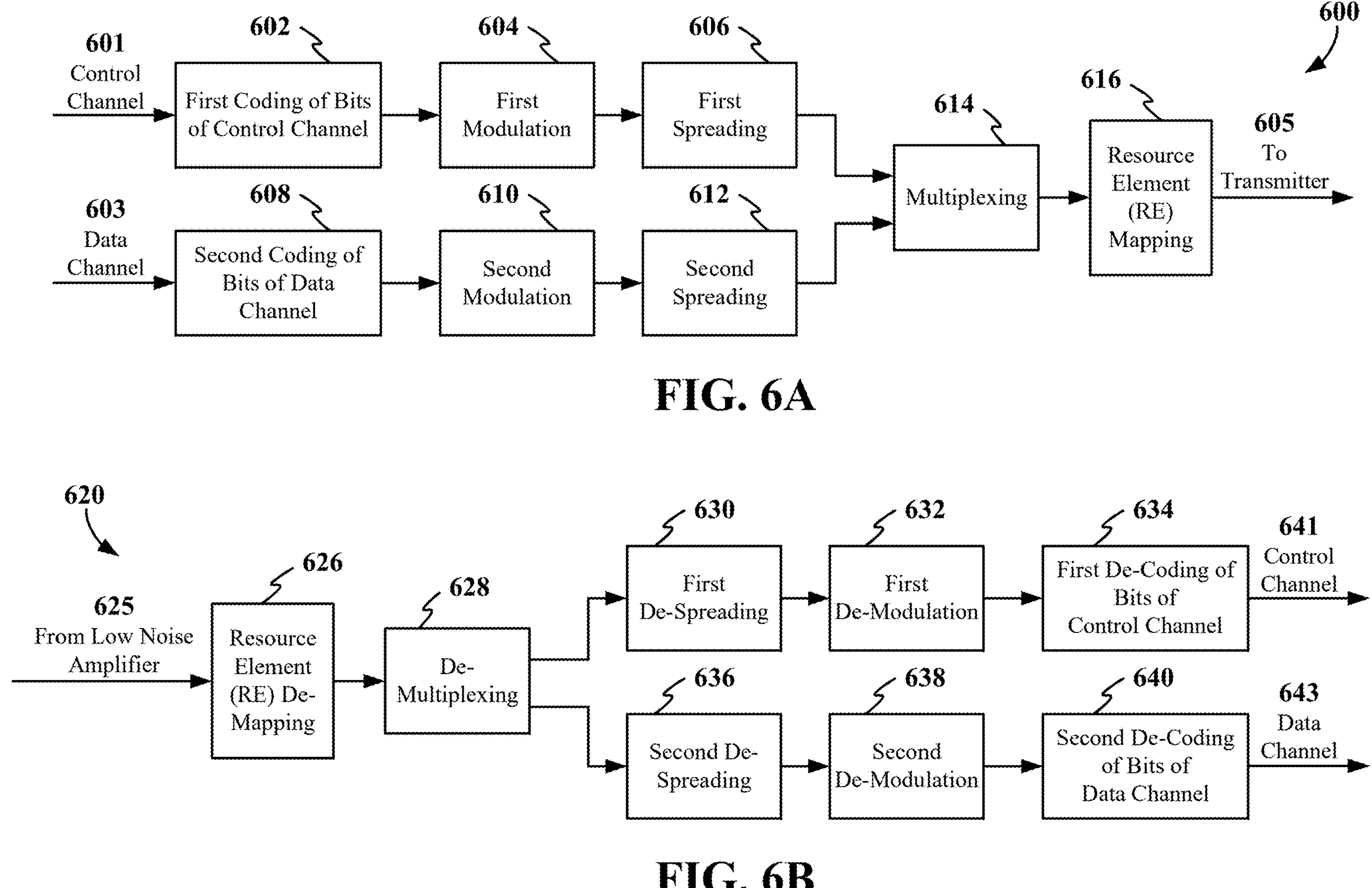
FIG. 6A is a block diagram illustrating a transmission method, including the superposition of a control channel with a data channel based on symbol-level spreading according to some aspects of the disclosure.
FIG. 6B is a block diagram illustrating a reception method, including the superposition of a control channel with a data channel based on symbol-level spreading according to some aspects of the disclosure.

FIG. 6A is a block diagram illustrating a transmission 600 method (e.g., a process), including the superposition of a control channel with a data channel based on symbol-level spreading according to some aspects of the disclosure. For purposes of discussion, FIG. 6A does not identify a start or an end to the method, as the method may be ongoing. On the left upper side of the figure is a control channel 601, and on the left lower side is a data channel 603. A plurality of control channels and a plurality of data channels are within the scope of the disclosure.

Operations at various points in the transmission 600 method illustrated in FIG. 6A may change between bit-level and symbol-level operations. For example, at the output of block 602 and block 608, before the first modulation at block 604 and the second modulation at block 610, operations are at a bit-level. However, operations are at a symbol-level following the first modulation at block 604 and the second modulation at block 610. Accordingly, the control channel spreading at block 606 and the data channel spreading at block 612 are at the symbol-level.

At the left upper side of the figure, at block 602, a first encoder (e.g., an apparatus and/or a function, not shown) receives bits of the control channel 601 (or bits of control channels) and codes (e.g., encodes) the bits. The first encoder produces (e.g., generates) a plurality of coded bits of the control channel.

At block 604, a first modulator (e.g., an apparatus and/or a function, not shown) modulates the plurality of coded bits of the control channel using a first modulation scheme to obtain a plurality of control channel symbols. At block 606, a first spreader (e.g., an apparatus and/or function, not shown) spreads the plurality of control channel symbols using a first spreading code to obtain a spread plurality of control channel symbols.

Turning to the left lower side of the figure, at block 608, a second encoder (e.g., an apparatus and/or a function, not shown) receives bits of the data channel 603 (or bits of data channels) and encodes the bits. The second encoder produces (e.g., generates) a plurality of coded bits of the data channel. At block 610, a second modulator (e.g., an apparatus and/or a function, not shown) modulates the plurality of coded bits of the data channel using a second modulation scheme to obtain a plurality of data channel symbols. At block 612, a second spreader (e.g., an apparatus and/or a function, not shown) spreads the plurality of data channel symbols using a second spreading code to obtain a spread plurality of data channel symbols.

According to aspects described herein, the first coding (e.g., first coding algorithm) at block 602 may be different from the second coding (e.g., second coding algorithm) at block 608 to distinguish control bits from data bits. However, according to some aspects, the first coding (e.g., first coding algorithm) at block 602 may be the same or different from the second coding (e.g., second coding algorithm) at block 608. The first modulation at block 604 (e.g., a first type of modulation) may be different from the second modulation at block 610 (e.g., a second type of modulation) to distinguish the control channel from the data channel. However, according to some aspects, the first modulation at block 604 (e.g., a first type of modulation) may be the same or different from the second modulation at block 610 (e.g., a second type of modulation). The control channel spreading at block 606 (e.g., a first spreading code may be used) may be different from the data channel spreading at block 612 (e.g., a second spreading code may be used) to distinguish the control channel from the data channel. However, according to some aspects, the control channel spreading at block 606 (e.g., first spreading code used) may be the same or different from the data channel spreading at block 612 (e.g., second spreading code used).

Turning to block 614, a multiplexer (e.g., an apparatus and/or a function, not shown) may take the spread plurality of control channel symbols (obtained from block 606) and the spread plurality of data channel symbols (obtained from block 612) as input and as output may produce (e.g., generate, provide) a multiplexed combination of the spread plurality of control channel symbols and the spread plurality of data channel symbols.

At block 616, a resource element (RE) mapper (e.g., an apparatus and/or a function, not shown) may map the multiplexed combination of the spread plurality of control channel symbols and the spread plurality of data channel symbols to at least one resource element (RE) in a time-frequency resource grid (such as the OFDM resource grid 404 as shown and described in connection with FIG. 4). Thereafter, the multiplexed combination of the spread plurality of control channel symbols and the spread plurality of data channel symbols that were mapped to the at least one resource element in the time-frequency resource grid may be output 605 to a transmitter (not shown) according to some aspects of the disclosure.

FIG. 6B is a block diagram illustrating a reception 620 method (e.g., a process), including the superposition of a control channel with a data channel based on symbol-level spreading according to some aspects of the disclosure. For purposes of discussion, FIG. 6B does not identify the method's start or end, as the method may be ongoing. On the right upper side of the figure is a control channel 641, and on the right lower side is a data channel 643. A plurality of control channels and a plurality of data channels are within the scope of the disclosure. The process of FIG. 6B may be the reverse of the process of FIG. 6A according to some aspects of the disclosure.

On the left side of FIG. 6B, a signal 625 from a low noise amplifier (not shown) may be received. The signal 625 may correspond to a multiplexed combination of a spread plurality of control channel symbols and a spread plurality of data channel symbols, which may be mapped to at least one resource element in a time-frequency resource grid (e.g., such as the OFDM resource grid 404 as shown and described in connection with FIG. 4) according to some aspects of the disclosure.

At block 626, a resource element (RE) de-mapper (e.g., an apparatus and/or a function, not shown) may de-map the multiplexed combination of the spread plurality of control channel symbols and the spread plurality of data channel symbols from at least one resource element in the time-frequency resource grid.

At block 628, a de-multiplexer (e.g., an apparatus and/or a function, not shown) may de-multiplex the spread plurality of control channel symbols from the spread plurality of data channel symbols. The de-multiplexed spread plurality of control channel symbols may be input (e.g., provided as input, applied) to block 630. The de-multiplexed spread plurality of data channel symbols may be input (e.g., provided as input, applied) to block 636.

At block 630, a first de-spreader (e.g., an apparatus and/or a function, not shown) may de-spread the spread plurality of control channel symbols using a first spreading code to obtain a modulated plurality of control channel symbols. At block 632, a first de-modulator (e.g., an apparatus and/or a function, not shown) may de-modulate the modulated plurality of control channel symbols using a first modulation scheme to obtain a plurality of coded bits of the control channel.

At block 634, a first de-coder (e.g., an apparatus and/or a function, not shown) may receive the plurality of coded bits of the control channel (or bits of control channels) and de-code the bits producing the bits of the control channel 641.

Returning to block 628, the de-multiplexer may provide the de-multiplexed spread plurality of data channel symbols to block 636. At block 636, a second de-spreader (e.g., an apparatus and/or a function, not shown) may de-spread the spread plurality of data channel symbols using a second spreading code to obtain a modulated plurality of data channel symbols. At block 638, a second de-modulator (e.g., an apparatus and/or a function, not shown) may de-modulate the modulated plurality of data channel symbols using a second modulation scheme to obtain a plurality of coded bits of the data channel.

At block 640, a second de-coder (e.g., an apparatus and/or a function, not shown) may receive the plurality of coded bits of the data channel (or bits of data channels) and may de-code the bits to produce the bits of the data channel 643.

According to aspects described herein, the first de-coding (e.g., first de-coding algorithm) at block 634 may be different from the second de-coding (e.g., second de-coding algorithm) at block 640 to differentiate between a control channel and a data channel. However, according to some aspects, the first de-coding (e.g., first de-coding algorithm) at block 634 may be the same or different from the second de-coding (e.g., second de-coding algorithm) at block 640. The first de-modulation at block 632 (e.g., a first type of modulation/de-modulation) may be different from the second de-modulation at block 638 (e.g., a second type of modulation/de-modulation) to differentiate between the control channel and the data channel. However, according to some aspects, the first de-modulation at block 632 (e.g., the first type of modulation/de-modulation) may be the same or different from the second de-modulation at block 638 (e.g., the second type of modulation/de-modulation). The first de-spreading at block 630 (e.g., first de-spreading code used) may be different from the second de-spreading at block 636 (e.g., second de-spreading code used) to differentiate between the control channel and the data channel. However, according to some aspects, the first de-spreading at block 630 (e.g., first de-spreading code used) may be the same or different from the second de-spreading at block 636 (e.g., second de-spreading code used).

In greater detail, and according to some examples, with respect to the transmission 600 method of FIG. 6A and the reception 620 method of FIG. 6B, different spreading codes (e.g., first spreading code and second spreading code utilized (e.g., employed, applied) at block 606 and block 612) may be applied to control symbols and data symbols to enable successive decoding (e.g., using counterpart codes) at a receiver. As used herein, different spreading codes may mean different spreading sequences or may mean the same type of sequence but with different spreading factors.

Different spreading codes applied to control symbols and data symbols are useful because a receiver (e.g., at a user equipment or a base station, a network entity) needs to decode both control channels and data channels. According to some examples, the receiver may start with one (i.e., decode the first one) and then subtract the decoded one from the total received signal. Different spreading factors facilitate the differentiation of one channel (e.g., a control channel) from another channel (e.g., a data channel). The different spreading factors simplify the receiver reception by enabling successive interference cancellation (SIC). Accordingly, as a result of the different spreading codes, the receiver may distinguish a stronger channel (e.g., a first channel with a larger spreading factor than a second channel or a spreading sequence used by the first channel that is easier to decode than the sequence used by the second channel) from a weaker channel. The receiver may decode the stronger channel first, and then the stronger channel may be subtracted from the received signal to reveal the weaker channel. Accordingly, having a hierarchy associated with the spreading codes facilitates the differentiation of the control channel from the data channel and vice versa. It is noted that either the control channel or the data channel may be selected as the stronger channel, in which case the unselected channel may be designated the weaker channel.

According to some aspects, different spreading factors may be configured for a control channel (or control channels) and a data channel (or data channels) to provide different processing gains. As a result of the different processing gains (in other words, as a result of the processing gain difference), the channel associated with the larger spreading factor (sometimes referred to as the stronger channel when compared to the channel with the smaller spreading factor) may be decoded first and then subtracted from the received signal to facilitate successive interference cancellation (SIC). The receiver may continue to decode the channel associated with the smaller spreading factor (sometimes referred to as the weaker channel when compared to the channel with the larger spreading factor) after canceling the channel associated with the larger spreading factor (i.e., after canceling the stronger channel). Based on the capability of the receiver (e.g., at either the network or the user equipment side), iterative demodulation and decoding may be performed to improve reliability.

According to some examples, a larger spreading factor may be applied to the PDCCH (i.e., the control channel) to simplify blind decoding at a user equipment. For example, a range of spreading factors may be configured as a function of the aggregation level of the control channel element (CCE).

In some examples, the spreading code of a control channel (e.g., PDCCH or PUCCH) may be configured by RRC signaling.

In some examples, the spreading code of a data channel (e.g., PDSCH or PUSCH) may be configured by RRC signaling or indicated by a downlink control information (DCI) or a medium access control-control element (MAC CE).

In some examples, the spreading codes may be generated as antipodal orthogonal sequences (e.g., Hadamard, orthogonal variable spreading factor (OVSF)) or (quasi-) orthogonal multi-phase sequences with constant magnitude (e.g., constant amplitude zero autocorrelation (CAZAC), discrete Fourier transform (DFT)).

In one example of downlink, where a control channel (PDCCH) and a data channel (PDSCH) are multiplexed together, the spreading code of the PDSCH may be provided by the PDCCH. This provision may simplify messaging because a user equipment will always apply blind decoding to the PDCCH first. After the user equipment blind decodes the PDCCH from a DCI, the user equipment may obtain the control information, such as the spreading code used by the data channel, and then proceed with decoding the PDSCH. However, if the user equipment cannot decode the PDCCH, it will be unable to decode the PDSCH. Accordingly, the benefit of indicating the spreading code of the PDSCH in the DCI is that the DCI may be more flexible than RRC signaling. Still, the drawback of using DCI (i.e., indicating the spreading code of the PDSCH in the DCI) is that if the user equipment cannot decode the PDCCH, it will also be unable to decode the PDSCH.

Figure 7:
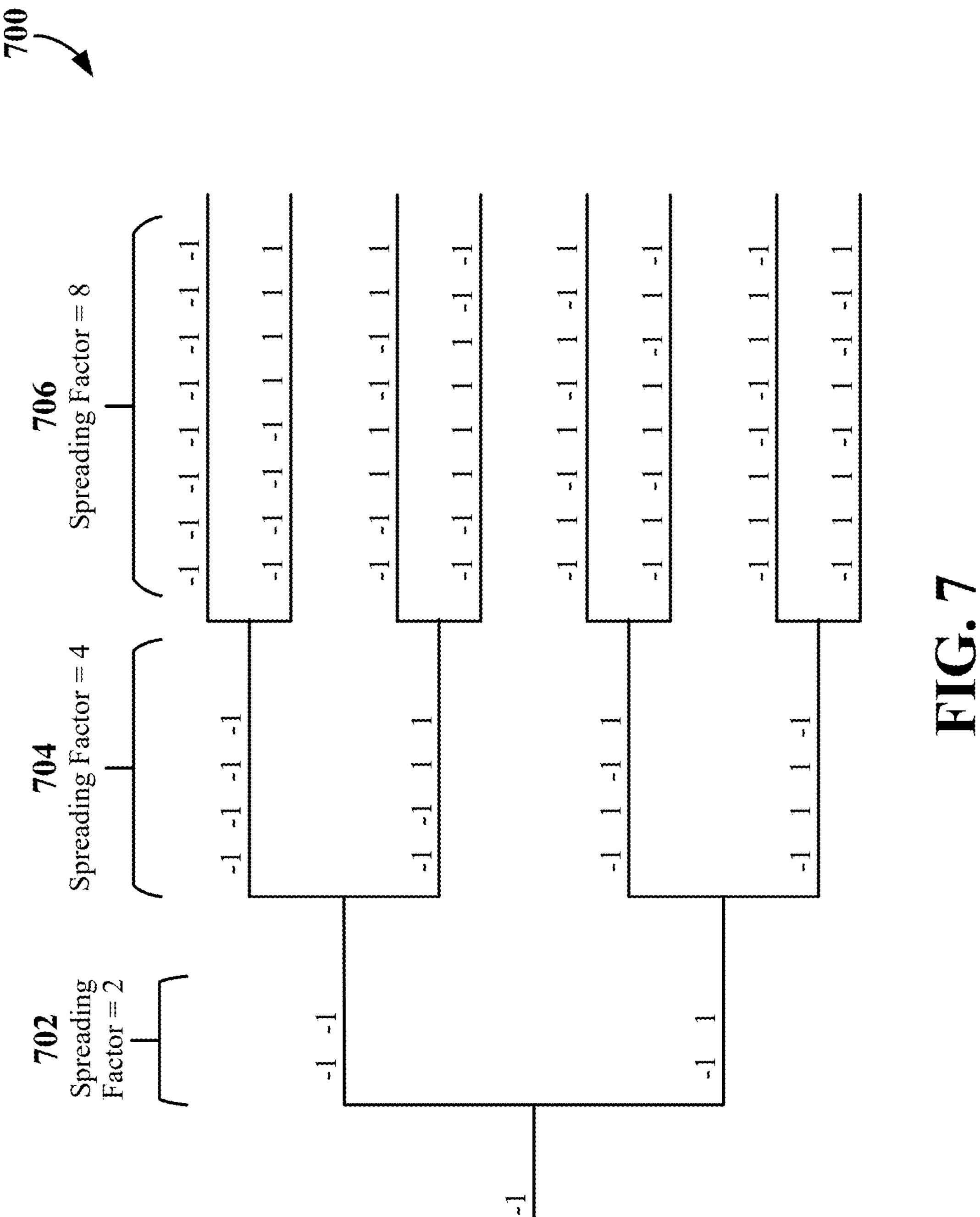
FIG. 7 is an example of a set of binary spreading sequences according to some aspects of the disclosure.

FIG. 7 is an example of a set of binary spreading sequences 700 according to some aspects of the disclosure. The binary spreading sequences 700 may be antipodal in some examples. The values in the spreading sequence of FIG. 7 are associated with symbols (as applied to symbol-level spreading) in contrast to bits. The sequence may be multi-phase, meaning the values may represent complex numbers (as in QPSK modulation). According to some aspects, the modulation order of control and data channels may be different (e.g., bi-phase shift key (BPSK) or quadrature phase shift key (QPSK) for control, 16 quadrature amplitude modulation (16QAM) for data). Additionally, a control channel may be configured with a higher spreading factor (SF) (e.g., spreading code [−1 1 −1 1] for the control channel and spreading code [−1 −1] for the data channel). Configuring the control channel with the higher spreading factor may facilitate SIC decoding.

A larger spreading factor applied to a PDCCH may simplify blind decoding at the user equipment. This results because the larger the spreading factor, the greater the processing gain. For example, a spreading factor of eight 706 for the control channel (PDCCH) allows a receiver to choose one of the eight rightmost branches of the set of binary spreading sequences 700. With a spreading factor of eight 708, the PDCCH will be repeated eight times across the time domain or the frequency domain. However, if the data channel (PDSCH) uses a spreading factor of four 704, the PDSCH is repeated only four times. With a spreading factor of two 702, the PDSCH is repeated only two times. So, with the spreading factor of eight 706, by repeating the PDCCH eight times, the user equipment will have eight observations and will be able to combine the eight observations to improve the probability of correct decoding. However, in this example, the data channel only has a spreading factor of four 704, so only four observations of the data channel would be made. Therefore, the user equipment will only be able to combine the four observations of the data channel (making the probability of correct decoding of the PDSCH less than that of the PDCCH).

Another benefit of symbol-level spreading in superposition transmission is exhibited in FIG. 7. Using the spreading factor of eight 706 as an example, the spreading factor of eight 706 provides a family of eight different sequences of eight observation repetitions. That is, the rightmost side of FIG. 7 has a column of eight spreading sequences, each providing eight observations. Thus, one could assign eight different spreading sequences, each having eight observations, to eight different user equipments, which makes this scheme more robust to noise and interference.

Figures 8A, 8B:
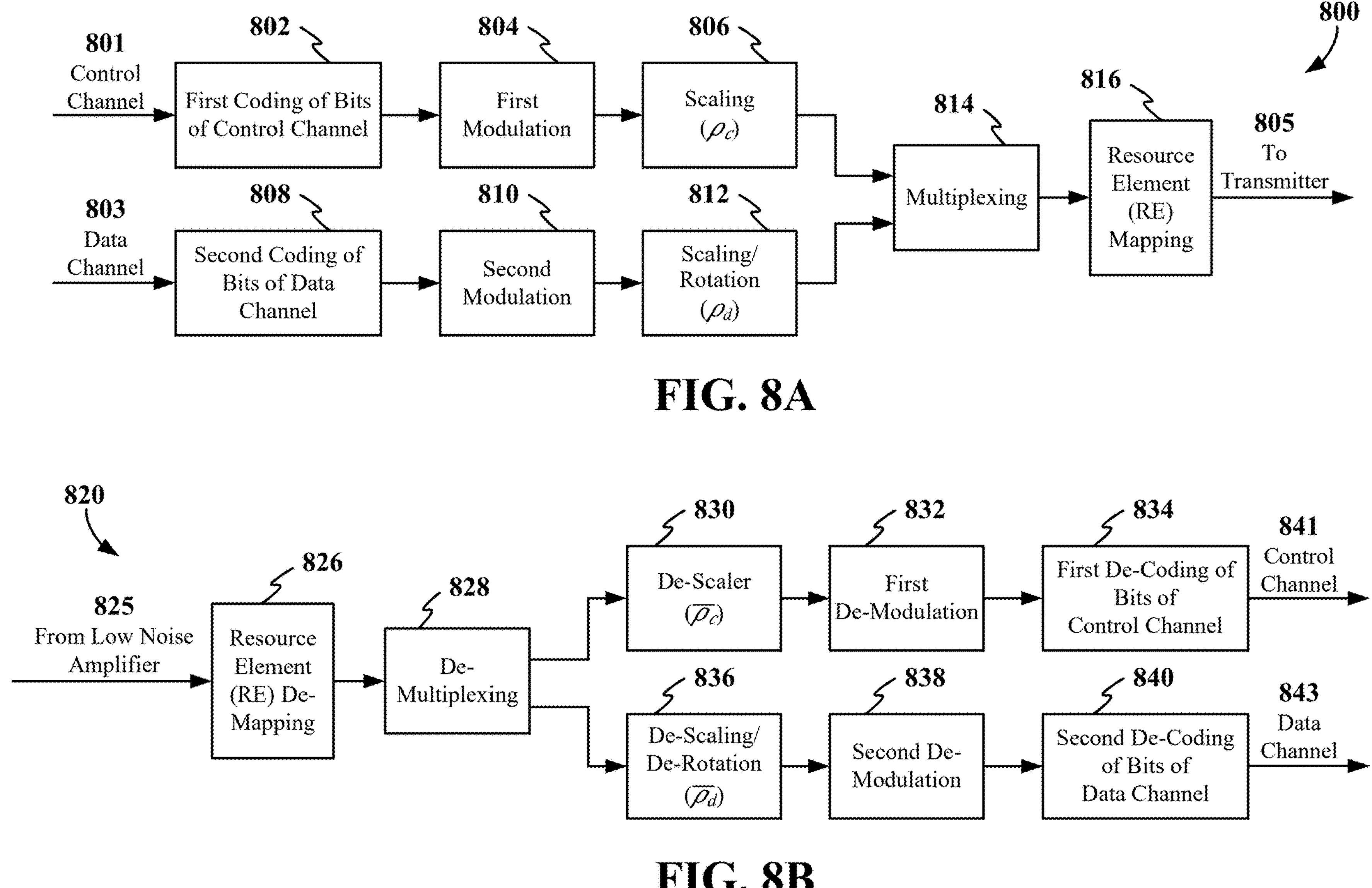
FIG. 8A is a block diagram illustrating a transmission method, including the superposition of a control channel with a data channel employing hierarchical modulation, and based on constellation scaling and/or rotation according to some aspects of the disclosure.
FIG. 8B is a block diagram illustrating a reception method, including the superposition of a control channel with a data channel employing hierarchical modulation and based on constellation scaling and/or rotation according to some aspects of the disclosure.

FIG. 8A is a block diagram illustrating a transmission 800 method (e.g., a process), including the superposition of a control channel with a data channel employing hierarchical modulation and based on constellation scaling and/or rotation according to some aspects of the disclosure. For purposes of discussion, FIG. 8A does not identify a start or an end to the method, as the method may be ongoing. On the left upper side of the figure is a control channel 801, and on the left lower side of the figure is a data channel 803. A plurality of control channels and a plurality of data channels are within the scope of the disclosure.

Operations at various points in the transmission 800 method illustrated in FIG. 8A may change between bit-level and symbol-level operations. For example, at the output of block 802 and block 808, prior to modulation at block 804 and block 810, operations are at a bit-level. However, operations are at a symbol-level following modulation at block 804 and block 810. Accordingly, the control channel scaling at block 806 and the data channel scaling and/or rotation at block 812 are at the symbol-level.

At the left upper side of the figure, at block 802, a first encoder (e.g., an apparatus and/or a function, not shown) receives bits of a control channel 801 (or bits of control channels) and codes (e.g., encodes) the bits. The first encoder produces (e.g., generates) a plurality of coded bits of the control channel.

At block 804, a first modulator (e.g., an apparatus and/or a function, not shown) modulates the plurality of coded bits of the control channel using a first modulation scheme to obtain a plurality of control channel symbols. At block 806, a constellation scaler (e.g., an apparatus and/or function, not shown) scales a constellation of control channel symbols using a control channel scaling factor (Pc) to obtain a scaled constellation of control channel symbols.

Turning to the left lower side of the figure, at block 808, a second encoder (e.g., an apparatus and/or a function, not shown) receives bits of a data channel 803 (or bits of data channels) and encodes the bits. The second encoder produces (e.g., generates) a plurality of coded bits of the data channel. At block 810, a second modulator (e.g., an apparatus and/or a function, not shown) modulates the plurality of coded bits of the data channel using a second modulation scheme to obtain a plurality of data channel symbols. At block 812, a constellation scaler and/or rotator (e.g., an apparatus and/or a function, not shown) scales and/or rotates a constellation of data channel symbols using a data channel scaling and/or rotation factor (Pd) to obtain a scaled and/or rotated constellation of data channel symbols.

According to aspects described herein, the first coding (e.g., first coding algorithm) at block 802 may be different from the second coding (e.g., second coding algorithm) at block 808 to distinguish control bits from data bits. However, according to some aspects, the first coding (e.g., first coding algorithm) at block 802 may be the same or different from the second coding (e.g., second coding algorithm) at block 808. The first modulation at block 804 (e.g., a first type of modulation) may be different from the second modulation at block 810 (e.g., a second type of modulation) to distinguish the control channel from the data channel. However, according to some aspects, the first modulation at block 804 (e.g., the first type of modulation) may be the same or different from the second modulation at block 810 (e.g., the second type of modulation). The scaling of the control channel scaling factor (Pc) may be different from the scaling of the data channel scaling and/or rotation factor (Pd) to distinguish the control channel from the data channel. However, according to some aspects, the scaling of the control channel scaling factor (Pc) may be the same as the scaling of the data channel scaling and/or rotation factor (Pd) so long as the rotation factor applies some detectable, discoverable, rotation of the constellation of control channel symbols versus the constellation of the data channel symbols. Nothing herein limits the control channel symbols to be scaled and the data channel symbols to be scaled and/or rotated; it is within the scope of the disclosure to have the data channel symbols scaled and the control channel symbols scaled and/or rotated.

Turning to block 814, a multiplexer (e.g., an apparatus and/or a function, not shown) may take the scaled constellation of control channel symbols (obtained from block 806) and the scaled and/or rotated constellation of data channel symbols (obtained from block 812) as input and as output may produce (e.g., generate, provide) a multiplexed combination of the scaled constellation of control channel symbols and the scaled and/or rotated constellation of data channel symbols.

At block 816, a resource element (RE) mapper (e.g., an apparatus and/or a function, not shown) may map the multiplexed combination of the scaled constellation of control channel symbols and the scaled and/or rotated constellation of data channel symbols to at least one resource element (RE) in a time-frequency resource grid (such as the OFDM resource grid 404 as shown and described in connection with FIG. 4). Thereafter, the multiplexed combination of the scaled constellation of control channel symbols and the scaled and/or rotated constellation of data channel symbols that were mapped to the at least one resource element in the time-frequency resource grid may be output 805 to a transmitter (not shown) according to some aspects of the disclosure.

FIG. 8B is a block diagram illustrating a reception 820 method (e.g., a process), including the superposition of a control channel with a data channel employing hierarchical modulation and based on constellation scaling and/or rotation according to some aspects of the disclosure. For purposes of discussion, FIG. 8B does not identify the method's start or end, as the method may be ongoing. On the right upper side of the figure is a control channel 841, and on the right lower side of the figure is a data channel 843. A plurality of control channels and a plurality of data channels are within the scope of the disclosure. The process of FIG. 8B may be the reverse of the process of FIG. 8A according to some aspects of the disclosure.

On the left side of FIG. 8B, a signal 825 from a low noise amplifier (not shown) may be received. The signal 825 may correspond to a multiplexed combination of the scaled constellation of control channel symbols and the scaled and/or rotated constellation of data channel symbols, which may be mapped to at least one resource element in a time-frequency resource grid (e.g., such as the OFDM resource grid 404 as shown and described in connection with FIG. 4) according to some aspects of the disclosure. Of course, nothing herein limits the constellation of control channel symbols to be scaled and the constellation of data channel symbols to be scaled and/or rotated; it is within the scope of the disclosure to have the constellation of data channel symbols scaled and the constellation of control channel symbols scaled and/or rotated.

At block 826, a resource element (RE) de-mapper (e.g., an apparatus and/or a function, not shown) may de-map the multiplexed combination of the scaled constellation of control channel symbols and the scaled and/or rotated constellation of data channel symbols from at least one resource element in the time-frequency resource grid.

At block 828, a de-multiplexer (e.g., an apparatus and/or a function, not shown) may de-multiplex the scaled constellation of control channel symbols from the scaled and/or rotated constellation of data channel symbols. The de-multiplexed scaled constellation of control channel symbols may be input (e.g., provided) to block 830. The de-multiplexed scaled and/or rotated constellation of data channel symbols may be input (e.g., provided) to block 836.

At block 830, a constellation de-scaler (e.g., an apparatus and/or a function, not shown) may de-scale the scaled constellation of control channel symbols using a de-scaling factor ($\overline{\rho_c}$) to obtain a modulated plurality of control channel symbols. At block 832, a first de-modulator (e.g., an apparatus and/or a function, not shown) may de-modulate the modulated plurality of control channel symbols using a first modulation scheme to obtain a plurality of coded bits of the control channel.

At block 834, a first de-coder (e.g., an apparatus and/or a function, not shown) may receive the plurality of coded bits of the control channel (or bits of control channels) and de-code the bits producing the bits of the control channel 841.

Returning to block 828, the de-multiplexer may provide the de-multiplexed scaled and/or rotated constellation of data channel symbols to block 836. At block 836, a de-scaler and/or de-rotator (e.g., an apparatus and/or a function, not shown) may de-scale and/or de-rotate the scaled and/or rotated constellation of data channel symbols using a de-scaling and/or de-rotation factor ($\overline{\rho_d}$) to obtain a modulated plurality of data channel symbols. At block 838, a second de-modulator (e.g., an apparatus and/or a function, not shown) may de-modulate the modulated plurality of data channel symbols using a second modulation scheme to obtain a plurality of coded bits of the data channel.

At block 840, a second de-coder (e.g., an apparatus and/or a function, not shown) may receive the plurality of coded bits of the data channel (or bits of data channels) and may de-code the bits to produce the bits of the data channel 843.

According to aspects described herein, the first de-coding (e.g., first de-coding algorithm) at block 834 may be different from the second de-coding (e.g., second de-coding algorithm) at block 840 to differentiate between a control channel and a data channel. However, according to some aspects, the control channel de-scaling (e.g., control channel de-scaling factor) at block 834 may be the same as the data channel de-scaling (e.g., data channel de-scaling algorithm) at block 840, so long as the rotation factor applies some detectable, discoverable, rotation of the constellation of control channel symbols versus the constellation of the data channel symbols.

In greater detail, and according to some examples, with respect to the transmission 800 method of FIG. 8A and the reception 820 method of FIG. 8B, different scaling factors (complex or real numbers) (e.g., control channel scaling and data channel scaling utilized (e.g., employed, applied) at block 806 and block 812) may be applied to control channel symbols and data channel symbols to create a constellation for hierarchical modulation. Without loss of generality, the magnitude of the scaling factor for the data channel can be normalized to 1 (i.e., $|\rho_d|=1$). The scaling factor for the control channel may be configured differently. Due to hierarchical modulation, the stronger channel associated with larger amplitude of scaling can be decoded first and then subtracted from the received signal to facilitate successive interference cancellation (SIC). The receiver can continue to decode the weaker channel after canceling the stronger channel.

A larger scaling factor (e.g., $|\rho_c|>1$) may be applied to the PDCCH in comparison to the PDSCH to simplify blind decoding at the user equipment, where the range of power scaling factors may be configured as a function of the aggregation level of CCE. The scaling and de-scaling factor of the control channel (e.g., PDCCH or PUCCH) and the rotation and de-rotation (i.e., phase rotation and phase de-rotation) factor of the data channel (e.g., PDSCH or PUSCH) may be configured by RRC signaling or indicated by DCI or MAC CE.

Figure 9:
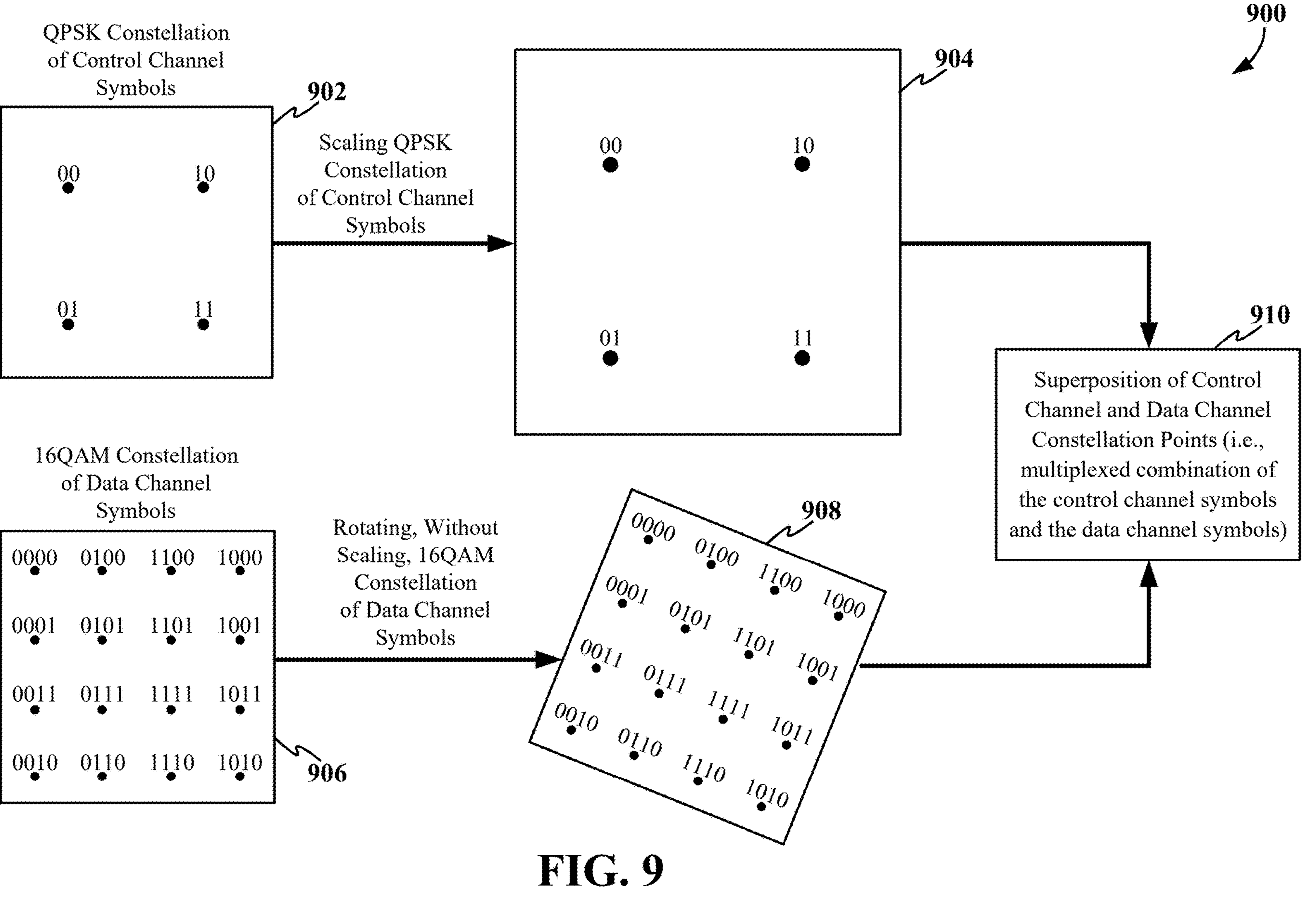
FIG. 9 is a graphical illustration of one example of a superposition of a constellation of control channel symbols and a constellation of data channel symbols according to some aspects of the disclosure.

FIG. 9 is a graphical illustration 900 of one example of a superposition of a constellation of control channel symbols 902 and a constellation of data channel symbols 906 according to some aspects of the disclosure. The control channel scaling factor (pc), also referred to herein as the control channel symbol constellation scaling factor, may be any non-zero real number ($\rho_c$>0). The example of FIG. 9 depicts a QPSK constellation of control channel symbols 902. The QPSK constellation includes four symbols (00, 10, 01, and 11). The constellation of control channel symbols may be scaled to be equal to a nominal constellation ($\rho_c$=1), larger than a nominal constellation ($\rho_c$>1), or may be smaller than a nominal constellation (0<$\rho_c$<1). A positively scaled 904 version (scaling factor of about 1.4 relative to the constellation of control channel symbols 902) of the QPSK constellation of control channel symbols 902 is shown to the right of the unscaled original version of the QPSK constellation of control channel symbols 902.

A 16QAM constellation of data channel symbols 906 includes 16 symbols (0000 through 1111). The data channel scaling factor (pd) may have both real and imaginary components (e.g., ρd=X+jY) to facilitate both scaling and rotation. The value of the real part (real component) X may be any non-zero real number (X>0). The value of the imaginary part (imaginary component) Y may be any positive, zero, or negative real number (−∞<Y<∞). The real, X, and imaginary part, Y, of the data channel scaling factor (ρd) may be referred to herein as a scaled, rotated, or both scaled and rotated constellation of data channel symbols. As shown in the example of FIG. 9, the scaled, rotated, or both scaled and rotated constellation of data channel symbols has a value of about 1+j0.384 radians (about 22 degrees). The rotated, without being scaled (i.e., real part of scaling factor equals 1), 16QAM constellation of data channel symbols 908 is shown to the right of the original unscaled 16QAM constellation of data channel symbols 906. At block 910, the apparatus may multiplex the scaled constellation of control channel symbols and the scaled, rotated, or both scaled and rotated constellation of data channel symbols to obtain a multiplexed combination of the control channel and the data channel. The multiplexed combination of the control channel (i.e., the control channel symbols) and the data channel (i.e., the data channel symbols) corresponds to the superposition of control channel and data channel constellation points/symbols.

According to some aspects, the hierarchical modulation based on constellation scaling and/or rotation, as shown described in connection with FIGS. 8A, 8B, and 9, may be used with superposition based on symbol-level spreading as shown and described in connection with FIGS. 6A, 6B, and 7, where the scaling factors and spreading factors may be jointly configured and applied to the control channel and/or the data channel.

Figure 10:
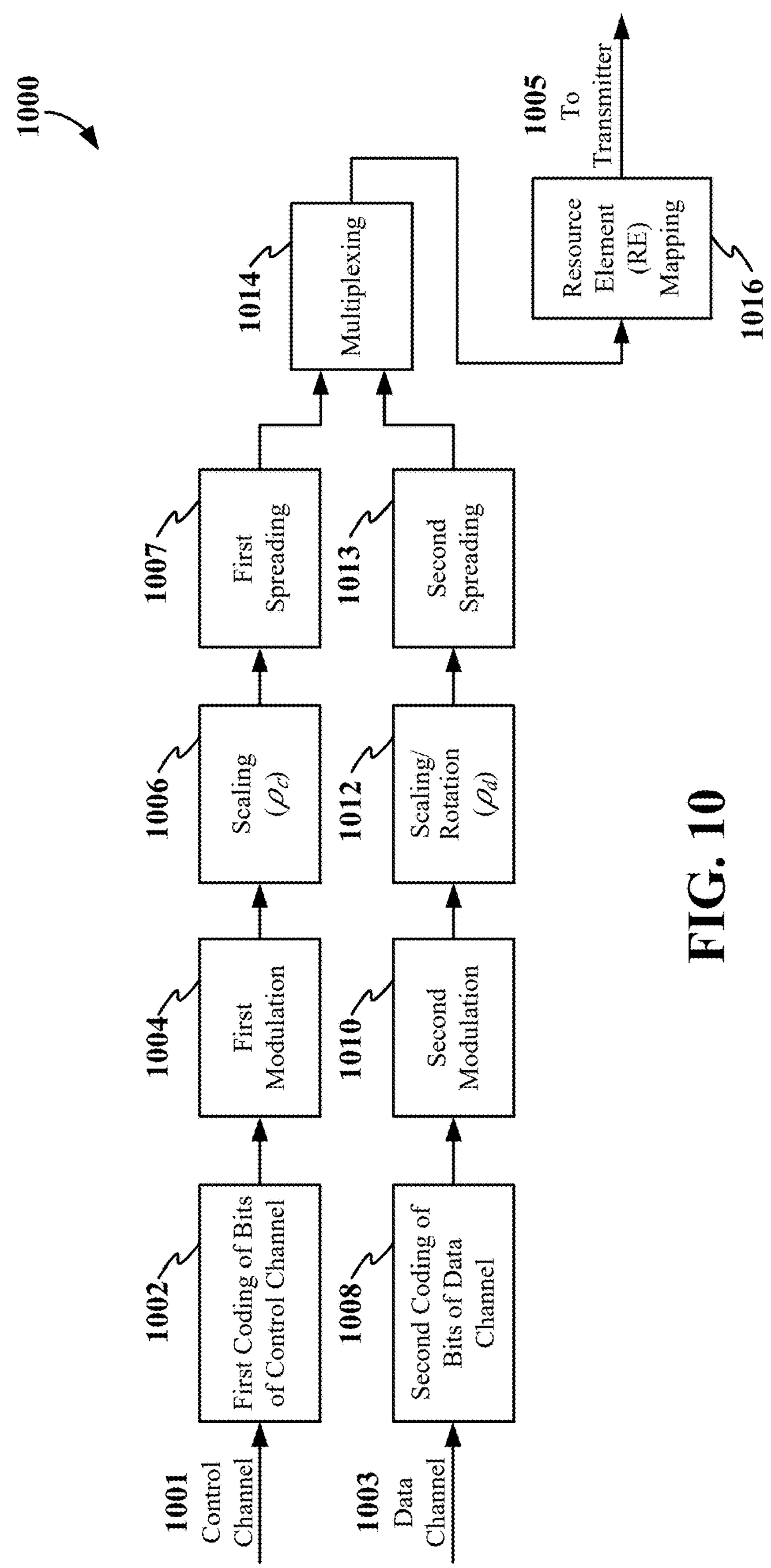
FIG. 10 is a block diagram illustrating a transmission method, including the superposition of a control channel with a data channel employing hierarchical modulation, and based on both constellation scaling and/or rotation and symbol-level spreading according to some aspects of the disclosure.

FIG. 10 is a block diagram illustrating a transmission 1000 method (e.g., a process), including the superposition of a control channel with a data channel employing hierarchical modulation and based on both constellation scaling and/or rotation and symbol-level spreading according to some aspects of the disclosure. To avoid redundancy, the control channel 1001, the first coding of bits of the control channel 1002, the first modulation 1004, the scaling 1006, the first spreading 1007, the data channel 1003, the second coding of bits of the data channel 1008, the second modulation 1010, the scaling and/or rotation 1012, the second spreading 1013, the multiplexing 1014, and the resource element mapping 1016 will not be described in detail because these features are the same as or similar to similarly named features as shown and described in connection with FIGS. 6A, 6B, 8A, 8B, and 9.

FIG. 10 is provided to illustrate the use of both scaling 1006 and first spreading 1007 in the control channel path, and the use of both scaling and/or rotation 1012 and second spreading 1013 in the data channel path. Although illustrated as preceding the spreading, the scaling (or the scaling and rotation) may follow the spreading in some aspects of the disclosure. The reception method (not shown to avoid duplication) proceeds in the reverse order of the transmission 1000 method, similar to the reception as depicted in FIG. 6B and FIG. 8B.

When the control channel and the data channels share the same precoding scheme, DMRS may be shared between the control channel and the data channel. When the control channel and the data channel have different precoding schemes, orthogonal sequences, Orthogonal Cover Codes (OCC), or antenna ports may be configured for DMRS of the control channel and the data channel separately. Precoding may be considered a spatial concept. Scaling may be done in a time-frequency domain. In instances where the control channel and the data channel are precoded, meaning they use the same beam in the spatial domain, the DMRS could be shared between the control channel and the data channel. This may be an advantage in the context of superposition transmission because, as implemented in LTE and NR, when the control channel and the data channel are transmitted separately, different DMRS are configured and transmitted independently. Configuring and transmitting the different DMRS independently consumes system overhead. However, if the control channel and the data channel are superimposed using the same precoding scheme, the DMRS resources may be shared between the control channel and the data channels. This provides a beneficial result, for example, in this case, where the receiver decodes the control channel, the receiver may use the DMRS in the control channel for channel estimation of the data channel. Similarly, when the user equipment decodes the data channel, the user equipment may reuse the DMRS, which means the DMRS does not need to be duplicated for the control channel and the data channel. This aspect may improve spectral efficiency and may save system overhead.

When multiple sub-bands are configured for data channel transmission (e.g., flexible spectrum integration (FSI) or carrier aggregation (CA)), a subset of the sub-bands may overlap with the control channels and adopt a superposition transmission scheme. For example, PDSCH may be mapped to two sub-bands (sub-band 1 and sub-band 2). PDCCH may be mapped to one of the two sub-bands (e.g., sub-band 1) and may, therefore, overlap with PDSCH mapped to one of the sub-bands (e.g., sub-band 1). For example, the CORESET is included in sub-band 1, consequently the PDCCH overlaps with the PDSCH. In this case, the superposition of the control channel and the data channel, as described herein, may be utilized.

Figure 11:
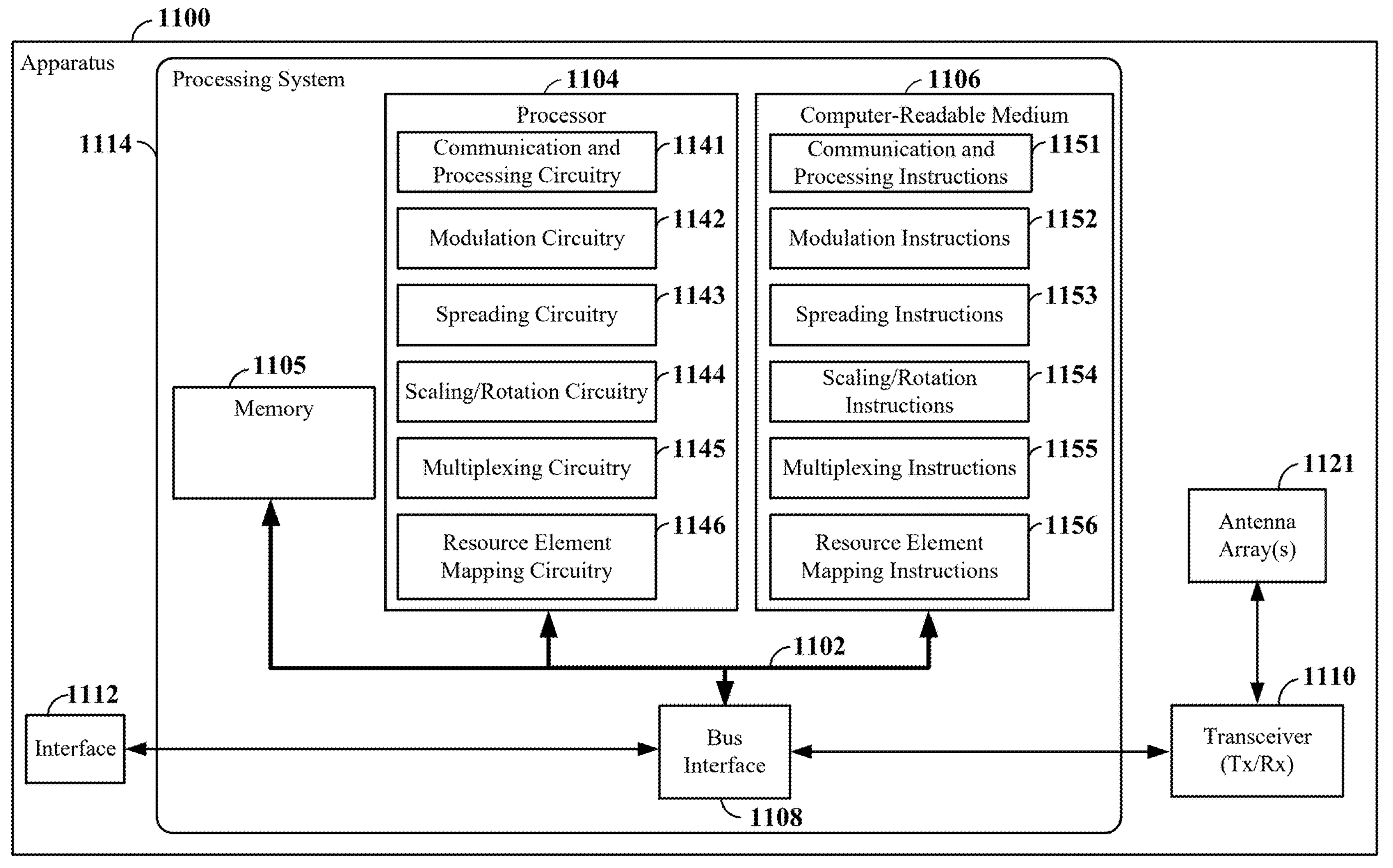
FIG. 11 is a block diagram illustrating an example of a hardware implementation of an apparatus employing one or more processing systems according to some aspects of the disclosure.

FIG. 11 is a block diagram illustrating an example of a hardware implementation of an apparatus 1100 (e.g., a wireless communication device, a UE, a scheduled entity, a base station, a gNB, an eNB, a scheduling entity), employing one or more processing systems (generally represented by processing system 1114) according to some aspects of the disclosure. The apparatus 1100 may be similar to, for example, any of the scheduled entities or scheduling entities of FIGS. 1, 2, and/or 3.

In accordance with various aspects of the disclosure, an element, any portion of an element, or any combination of elements may be implemented with a processing system 1114 that includes one or more processors, generally represented by processor 1104, and one or more memories, generally represented by the memory 1105 and additionally or alternatively generally represented by the computer-readable medium 1106. Examples of processor 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1100 may be configured to perform any one or more of the functions described herein. That is, the one or more processors (generally represented by processor 1104), as utilized in the apparatus 1100, may be configured to, individually or collectively, based at least in part on information stored in the one or more memories (generally represented by the memory 1105 and additionally or alternatively generally represented by the computer-readable medium 1106), implement (e.g., perform) any one or more of the methods or processes described and illustrated, for example, in FIGS. 1, 2, 3, 6A, 6B, 7, 8A, 8B, 9, and/or 10.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits, including one or more processors (generally represented by the processor 1104), one or more memories (generally represented by the memory 1105), and one or more computer-readable media (generally represented by the computer-readable medium 1106). The bus 1102 may also link various other circuits such as timing sources, peripherals, voltage regulators, and power management circuits, which are well known to persons having ordinary skill in the art and, therefore, will not be described any further.

A bus interface 1108 provides an interface between the bus 1102 and a transceiver 1110. The transceiver 1110 may be, for example, a wireless transceiver. The transceiver 1110 may be operational with multiple RATs (e.g., LTE, 5G NR, IEEE 802.11 (WiFi®), etc.). The transceiver 1110 may provide respective means for communicating with various other apparatus, UEs, network entities, and core networks over a transmission medium (e.g., air interface). The transceiver 1110 may be coupled to one or more respective antenna array(s) 1121. The bus interface 1108 may provide an interface between the bus 1102 and a user interface 1112 (e.g., keypad, display, touch screen, speaker, microphone, control features, vibration circuit/device, etc.). Of course, such a user interface 1112 is optional and may be omitted in some examples.

One or more processors, represented individually and collectively by processor 1104, may be responsible for managing the bus 1102 and general processing, including the execution of software stored (e.g., residing) on the memory 1105 and/or the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the one or more processors (generally represented by the processor 1104), causes the one or more processing systems (generally represented by the processing system 1114) to perform the various processes and functions described herein for any particular apparatus.

The computer-readable medium 1106 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities, including the processing system 1114. The computer-readable medium 1106 may be embodied in a computer program product or article of manufacture. For example, a computer program product or article of manufacture may include a computer-readable medium in packaging materials. In some examples, the computer-readable medium 1106 may be part of the memory 1105. Persons having ordinary skill in the art will recognize how best to implement the described functionality presented throughout this disclosure depending on the particular application and the overall design constraints imposed on the overall system. The computer-readable medium 1106 and/or the memory 1105 may also be used for storing data that is manipulated by the processor 1104 when executing software. For example, memory 1105 may store PDCCHs that are awaiting soft combining.

In some aspects of the disclosure, the one or more processors (generally represented by the processor 1104) may include communication and processing circuitry 1141 configured for various functions, including, for example, communicating with a user equipment (e.g., a scheduled entity), a network entity (e.g., a base station, a gNB, a scheduling entity), and/or a core network. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). According to some aspects, the communication and processing circuitry 1141, in combination with the transceiver 1110, may be configured to transmit a multiplexed combination of a control channel and a data channel, the multiplexed combination mapped to at least one resource element in a time-frequency resource grid.

In some examples, the communication and processing circuitry 1141, in association with transmitting a multiplexed combination of a control channel and a data channel, where the multiplexed combination may be mapped to at least one resource element in a time-frequency resource grid, may be further configured to superimpose a spread plurality of control channel symbols and a spread plurality of data channel symbols to obtain the multiplexed combination of the control channel and the data channel, and transmit the multiplexed combination as a single-user superposition transmission, which is different from a multi-user superposition transmission (MUST). In some examples, the apparatus 1100 may be a user equipment, and the user equipment may transmit the single-user superposition transmission in an uplink direction. In some examples, in connection with an uplink direction, the control channel may be conveyed in a physical uplink control channel (PUCCH). The data channel may be conveyed in a physical uplink shared channel (PUSCH). The one or more processors (generally represented by the processor 1104) in connection with the communication and processing circuitry 1141 and the transceiver 1110 may be configured to transmit the multiplexed combination of the control channel and the data channel as a superimposition of the PUCCH and the PUSCH on the at least one resource element. In some examples, in connection with a downlink direction, the control channel may be conveyed in a physical downlink control channel (PDCCH), and the data channel may be conveyed in a physical downlink shared channel (PDSCH). The one or more processors (generally represented by processor 1104) may be further configured to transmit the multiplexed combination of the control channel and the data channel as a superimposition of the PDCCH and the PDSCH on the at least one resource element. The communication and processing circuitry 1141 may further be configured to execute communication and processing instructions 1151 (e.g., software) stored, for example, on the computer-readable medium 1106 to implement one or more functions described herein.

In some aspects of the disclosure, the processor 1104 may include a modulation circuitry 1142 configured for various functions, including, for example, any one or more of modulating a plurality of coded bits of a control channel using a first modulation scheme to obtain a plurality of control channel symbols, modulating a plurality of coded bits of a data channel using a second modulation scheme to obtain a plurality of data channel symbols, modulating a plurality of coded bits of a control channel using a first modulation scheme to obtain a constellation of control channel symbols, and modulating a plurality of coded bits of a data channel using a second modulation scheme to obtain a constellation of data channel symbols. The modulation circuitry 1142 may further be configured to execute modulation instructions 1152 (e.g., software) stored, for example, on the computer-readable medium 1106 to implement one or more functions described herein.

In some aspects of the disclosure, the processor 1104 may include spreading circuitry 1143 configured for various functions, including, for example, any one or more of spreading the plurality of control channel symbols using a first spreading code to obtain a spread plurality of control channel symbols, and spreading the plurality of data channel symbols using a second spreading code to obtain a spread plurality of data channel symbols. In some examples, the spreading circuitry 1143 may be configured to utilize different lengths of the first spreading code and the second spreading code to distinguish the control channel associated with the first spreading code from the data channel associated with the second spreading code. The spreading circuitry 1143 may further be configured to execute spreading instructions 1153 (e.g., software) stored, for example, on the computer-readable medium 1106 to implement one or more functions described herein.

In some aspects of the disclosure, the processor 1104 may include scaling and/or rotation circuitry 1144 configured for various functions, including, for example, any one or more of scaling the constellation of control channel symbols using a control channel symbol constellation scaling factor to obtain a scaled constellation of control channel symbols, and scaling, rotating, or both scaling and rotating the constellation of data channel symbols using a data channel symbol constellation adjustment factor having a real part and an imaginary part to obtain a scaled, rotated, or both scaled and rotated constellation of data channel symbols. In one example, the scaling and/or rotation circuitry 1144 may be configured to utilize a non-zero rotation of the constellation of data channel symbols in response to equal scaling of the constellation of control channel symbols and the constellation of data channel symbols, to distinguish the control channel from the data channel. The scaling and/or rotation circuitry 1144 may further be configured to execute scaling and/or rotation instructions 1154 (e.g., software) stored on the computer-readable medium 1106 to implement one or more functions described herein.

In some aspects of the disclosure, for example, in association with transmitting a multiplexed combination of a control channel and a data channel, where the multiplexed combination may be mapped to at least one resource element in a time-frequency resource grid, the processor 1104 may include multiplexing circuitry 1145 configured for various functions, including, for example, any one or more of multiplexing a spread plurality of control channel symbols with a spread plurality of data channel symbols to obtain the multiplexed combination of the control channel and the data channel, and multiplexing a scaled constellation of control channel symbols and a scaled, rotated, or both scaled and rotated constellation of data channel symbols to obtain the multiplexed combination of the control channel and the data channel. As used herein, the construct "multiplexing A with B" has the same meaning as "multiplexing A and B." In one example, the control channel and the data channel may be multiplexed at a symbol-level. The multiplexing circuitry 1145 may further be configured to execute multiplexing instructions 1155 (e.g., software) stored on the computer-readable medium 1106 to implement one or more functions described herein.

In some aspects of the disclosure, the processor 1104 may include resource element (RE) mapping circuitry 1146 configured for various functions, including, for example, mapping the multiplexed combination of a control channel and a data channel to at least one resource element in a time-frequency resource grid. The resource element mapping circuitry 1146 may further be configured to execute resource element mapping instructions 1156 (e.g., software) stored on the computer-readable medium 1106 to implement one or more functions described herein.

Figure 12:
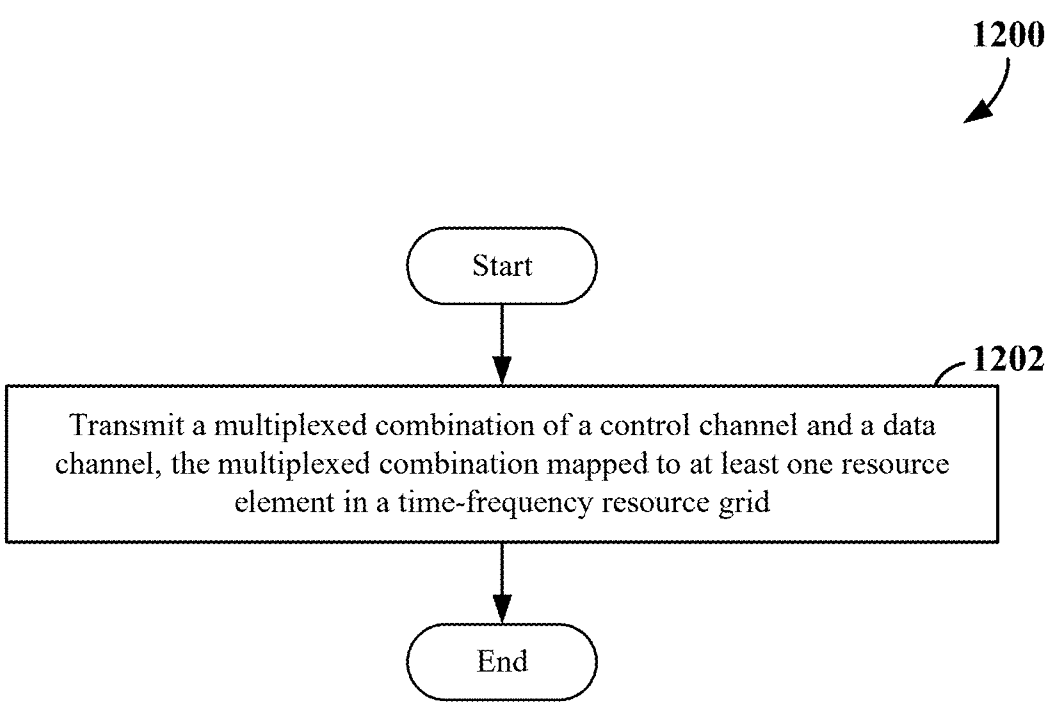
FIG. 12 is a flow chart illustrating an example process of wireless communication at an apparatus in accordance with some aspects of the disclosure.

FIG. 12 is a flow chart illustrating an example process 1200 (e.g., a method) of wireless communication at an apparatus (e.g., a UE or a network entity) in accordance with some aspects of the disclosure. As described below, some or all illustrated features may be omitted in a particular implementation within the scope of the present disclosure, and some illustrated features may not be required for implementation of all embodiments. In some examples, the process 1200 may be carried out by the apparatus 1100, as shown and described in connection with FIG. 11. The apparatus 1100 may be similar to, for example, any of the scheduled entities (e.g., UEs, mobile wireless devices) or scheduling entities (e.g., base stations, network entities) of FIGS. 1, 2, and/or 3. In some examples, the process 1200 may be carried out by any suitable apparatus or means for carrying out the functions or algorithm described below.

At block 1202, the apparatus may transmit a multiplexed combination of a control channel and a data channel, the multiplexed combination mapped to at least one resource element in a time-frequency resource grid. Thereafter, the process 1200 may end. For example, the communication and processing circuitry 1141, in combination with the resource element mapping circuitry 1146 and the transceiver 1110, as shown and described in connection with FIG. 11, may provide a means for transmitting a multiplexed combination of a control channel and a data channel, the multiplexed combination mapped to at least one resource element in a time-frequency resource grid. According to some aspects, the control channel and the data channel may be multiplexed at a symbol-level.

In some examples, one or more processors, which may be configured to, individually or collectively, based at least in part on information stored in one or more memories, may be further configured to superimpose a spread plurality of control channel symbols and a spread plurality of data channel symbols to obtain the multiplexed combination of the control channel and the data channel, and may further be configured to transmit the multiplexed combination as a single-user superposition transmission, which is different from a multi-user superposition transmission (MUST). For example, the communication and processing circuitry 1141, in combination with the resource element mapping circuitry 1146 and the transceiver 1110, as shown and described in connection with FIG. 11, may provide a means for superimposing a spread plurality of control channel symbols and a spread plurality of data channel symbols to obtain the multiplexed combination of the control channel and the data channel. According to some aspects, the apparatus may be a user equipment or a network entity (e.g., a base station). In an instance where the apparatus is a user equipment, the user equipment may transmit the single-user superposition transmission in an uplink direction.

By way of a first example, in an uplink direction, the control channel is conveyed in a physical uplink control channel (PUCCH), and the data channel is conveyed in a physical uplink shared channel (PUSCH). The one or more processors of the apparatus may be configured to transmit the multiplexed combination of the control channel and the data channel as a superimposition of the PUCCH and the PUSCH on the at least one resource element. By way of a second example, in a downlink direction, the control channel is conveyed in a physical downlink control channel (PDCCH), and the data channel is conveyed in a physical downlink shared channel (PDSCH). The one or more processors may be configured to transmit the multiplexed combination of the control channel and the data channel as a superimposition of the PDCCH and the PDSCH on the at least one resource element.

Figure 13:
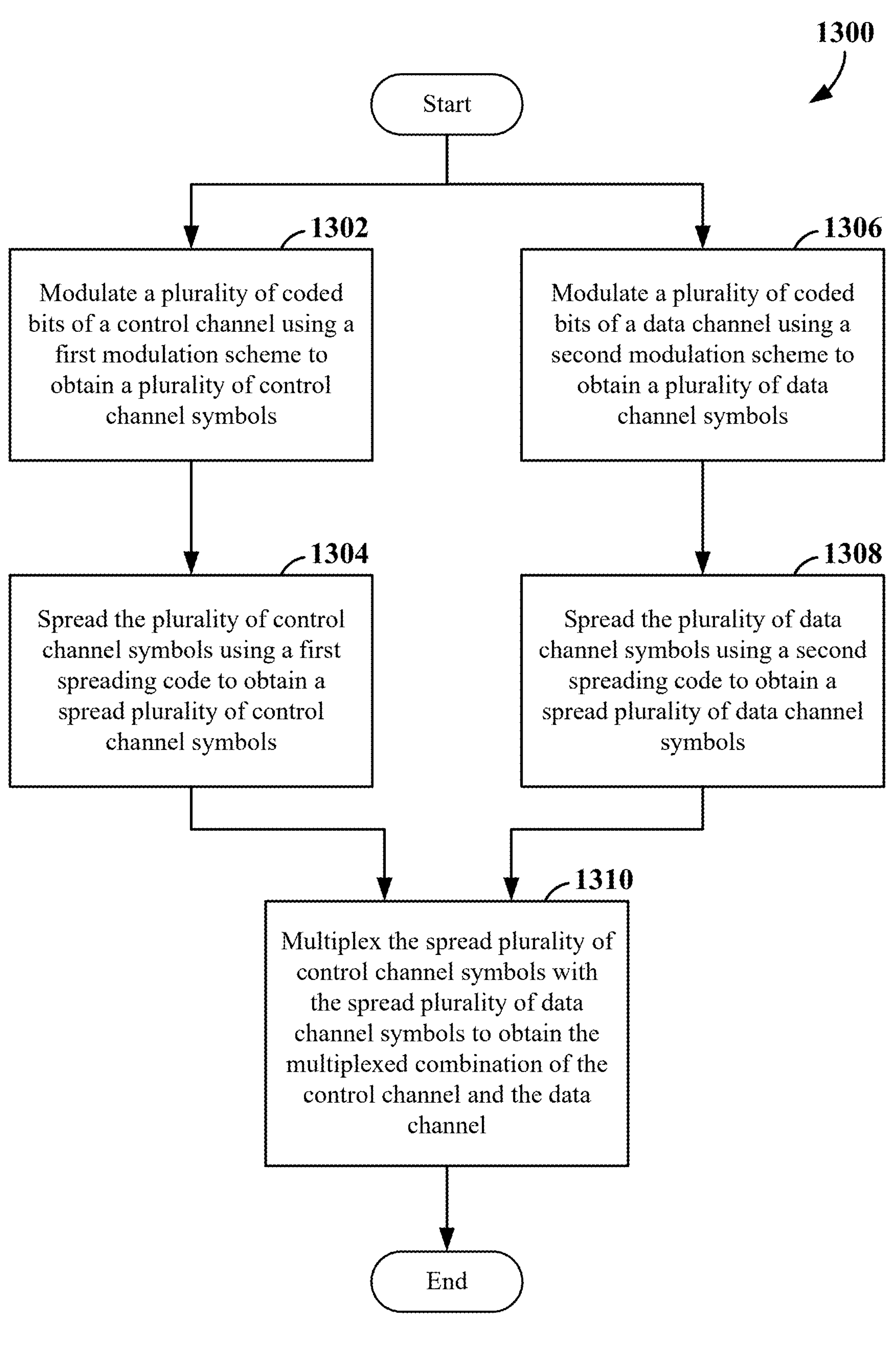
FIG. 13 is a flow chart illustrating an example process of wireless communication at an apparatus in accordance with some aspects of the disclosure.

FIG. 13 is a flow chart illustrating an example process 1300 (e.g., a method) of wireless communication at an apparatus (e.g., a UE or a network entity) in accordance with some aspects of the disclosure. As described below, some or all illustrated features may be omitted in a particular implementation within the scope of the present disclosure, and some illustrated features may not be required for implementation of all embodiments. In some examples, the process 1300 may be carried out by the apparatus 1100, as shown and described in connection with FIG. 11. The apparatus 1100 may be similar to, for example, any of the scheduled entities (e.g., UEs, mobile wireless devices) or scheduling entities (e.g., base stations, network entities) of FIGS. 1, 2, and/or 3. In some examples, the process 1300 may be carried out by any suitable apparatus or means for carrying out the functions or algorithm described below.

At block 1302, the apparatus may modulate a plurality of coded bits of a control channel using a first modulation scheme to obtain a plurality of control channel symbols. For example, the modulation circuitry 1142, as shown and described in connection with FIG. 11, may provide a means for modulating a plurality of coded bits of a control channel using a first modulation scheme to obtain a plurality of control channel symbols.

At block 1304, the apparatus may spread the plurality of control channel symbols using a first spreading code to obtain a spread plurality of control channel symbols. For example, the spreading circuitry 1143, as shown and described in connection with FIG. 11, may provide a means for spreading the plurality of control channel symbols using a first spreading code to obtain a spread plurality of control channel symbols.

At block 1306, in parallel with (or before or after) block 1302, the apparatus may modulate a plurality of coded bits of a data channel using a second modulation scheme to obtain a plurality of data channel symbols. For example, the modulation circuitry 1142, as shown and described in connection with FIG. 11, may provide a means for modulating a plurality of coded bits of a data channel using a second modulation scheme to obtain a plurality of data channel symbols.

At block 1308, in parallel with (or before or after) block 1304, the apparatus may spread the plurality of data channel symbols using a second spreading code to obtain a spread plurality of data channel symbols. For example, the spreading circuitry 1143, as shown and described in connection with FIG. 11, may provide a means for spreading the plurality of data channel symbols using a second spreading code to obtain a spread plurality of data channel symbols.

From block 1304 and block 1308, the process 1300 may proceed to block 1310. At block 1310, the apparatus may multiplex the spread plurality of control channel symbols with the spread plurality of data channel symbols to obtain the multiplexed combination of the control channel and the data channel. For example, the multiplexing circuitry 1145, as shown and described in connection with FIG. 11, may provide a means for multiplexing the spread plurality of control channel symbols with the spread plurality of data channel symbols to obtain the multiplexed combination of the control channel and the data channel. Thereafter, the process 1300 may end.

In some examples, the apparatus may utilize different lengths of the first spreading code and the second spreading code to distinguish the control channel associated with the first spreading code from the data channel associated with the second spreading code.

Figure 14:
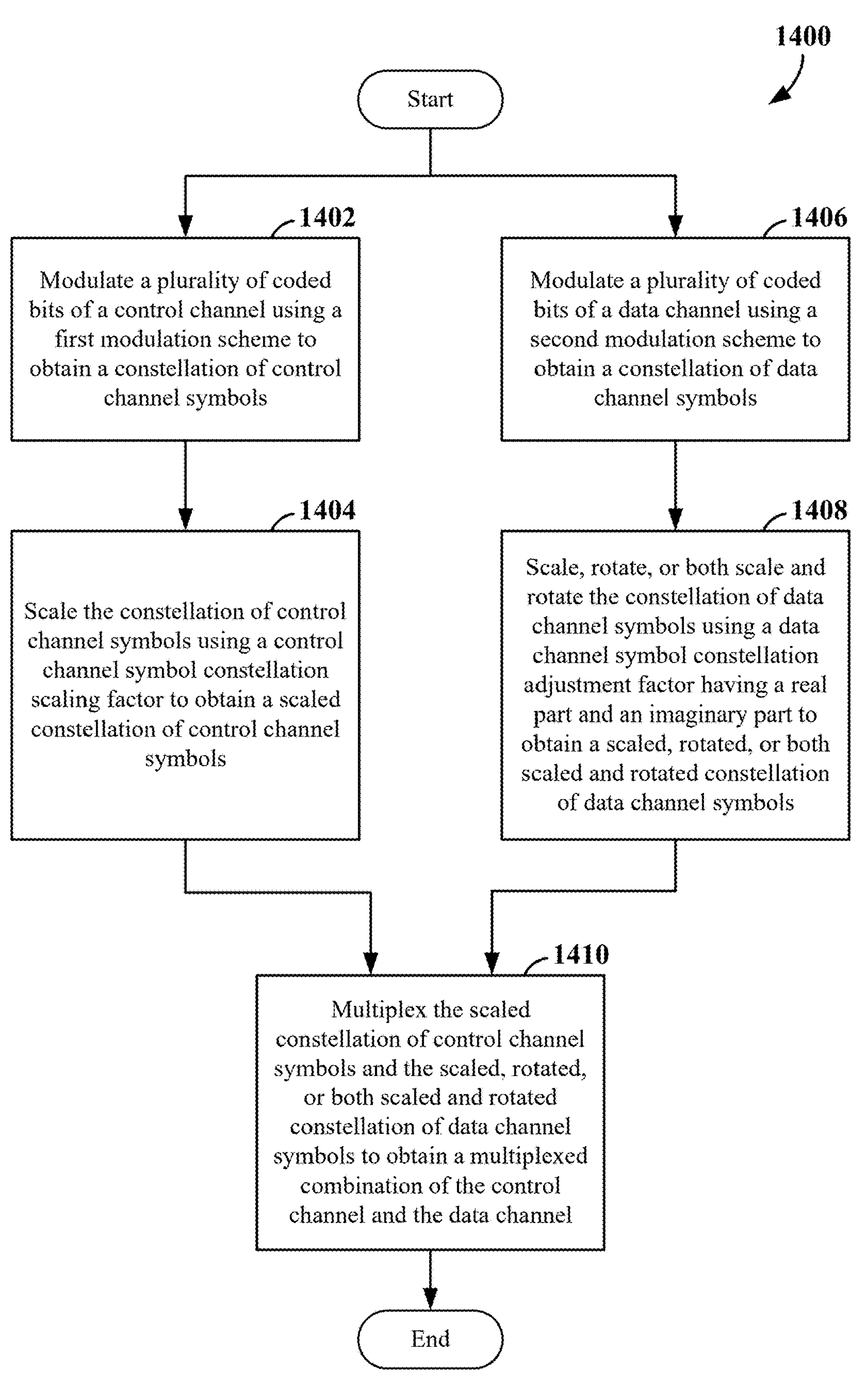
FIG. 14 is a flow chart illustrating an example process of wireless communication at an apparatus in accordance with some aspects of the disclosure.

FIG. 14 is a flow chart illustrating an example process 1400 (e.g., a method) of wireless communication at an apparatus (e.g., a UE or a network entity) in accordance with some aspects of the disclosure. As described below, some or all illustrated features may be omitted in a particular implementation within the scope of the present disclosure, and some illustrated features may not be required for implementation of all embodiments. In some examples, the process 1400 may be carried out by the apparatus 1100, as shown and described in connection with FIG. 11. The apparatus 1100 may be similar to, for example, any of the scheduled entities (e.g., UEs, mobile wireless devices) or scheduling entities (e.g., base stations, network entities) of FIGS. 1, 2, and/or 3. In some examples, the process 1400 may be carried out by any suitable apparatus or means for carrying out the functions or algorithm described below.

At block 1402, the apparatus may modulate a plurality of coded bits of a control channel using a first modulation scheme to obtain a constellation of control channel symbols. For example, the modulation circuitry 1142, as shown and described in connection with FIG. 11, may provide a means for modulating a plurality of coded bits of a control channel using a first modulation scheme to obtain a constellation of control channel symbols.

At block 1404, the apparatus may scale the constellation of control channel symbols using a control channel symbol constellation scaling factor to obtain a scaled constellation of control channel symbols. For example, the scaling and/or rotation circuitry 1144, as shown and described in connection with FIG. 11, may provide a means for scaling the constellation of control channel symbols using a control channel symbol constellation scaling factor to obtain a scaled constellation of control channel symbols.

At block 1406, in parallel with (or before or after) block 1402, the apparatus may modulate a plurality of coded bits of a data channel using a second modulation scheme to obtain a constellation of data channel symbols. For example, the modulation circuitry 1142, as shown and described in connection with FIG. 11, may provide a means for modulating a plurality of coded bits of a data channel using a second modulation scheme to obtain a constellation of data channel symbols.

At block 1408, in parallel with (or before or after) block 1404, that apparatus may scale, rotate, or both scale and rotate the constellation of data channel symbols using a data channel symbol constellation adjustment factor having a real part and an imaginary part to obtain a scaled, rotated, or both scaled and rotated constellation of data channel symbols. For example, the scaling and/or rotation circuitry 1144, as shown and described in connection with FIG. 11, may provide a means for scaling, rotation, or both scaling and rotation of the constellation of data channel symbols using a data channel symbol constellation adjustment factor having a real part and an imaginary part to obtain a scaled, rotated, or both scaled and rotated constellation of data channel symbols.

From block 1404 and block 1408, the process 1400 may proceed to block 1410. At block 1410, the apparatus may multiplex the scaled constellation of control channel symbols and the scaled, rotated, or both scaled and rotated constellation of data channel symbols to obtain a multiplexed combination of a control channel and a data channel. For example, the multiplexing circuitry 1145, as shown and described in connection with FIG. 11, may provide a means for multiplexing the scaled constellation of control channel symbols and the scaled, rotated, or both scaled and rotated constellation of data channel symbols to obtain a multiplexed combination of the control channel and the data channel. Thereafter, the process 1400 may end.

In some examples, the apparatus may utilize a non-zero rotation of the constellation of data channel symbols in response to equal scaling of the constellation of control channel symbols and the constellation of data channel symbols to distinguish the control channel from the data channel.

Of course, in the above examples, the circuitry included in the one or more processors of the apparatus, generally represented by the processor 1104 of the apparatus 1100 of FIG. 11, is merely provided as an example. Other means for carrying out the described processes or functions may be included within various aspects of the present disclosure, including but not limited to the instructions stored in the one or more computer-readable media, generally represented by the computer-readable medium 1106 and/or the memory 1105 of the apparatus 1100 of FIG. 11, or any other suitable apparatus or means described in any one of the FIGS. 1, 2, 3, 6A, 6B, 7, 8A, 8B, 9, 10, and/or 11 utilizing, for example, the processes and/or algorithms described herein in relation to FIGS. 5A, 5B, 6A, 6B, 7, 8A, 8B, 9, 10, 12, 13, and/or 14.

Aspect 1: An apparatus, comprising: one or more memories; and one or more processors being configured to, individually or collectively, based at least in part on information stored in the one or more memories: transmit a multiplexed combination of a control channel and a data channel, the multiplexed combination mapped to at least one resource element in a time-frequency resource grid.

The following provides an overview of aspects of the present disclosure:

Aspect 2: The apparatus of aspect 1, wherein the control channel and the data channel are multiplexed at a symbol-level.

Aspect 3: The apparatus of aspect 1 or aspect 2, wherein the one or more processors are further configured to: modulate a plurality of coded bits of the control channel using a first modulation scheme to obtain a plurality of control channel symbols; spread the plurality of control channel symbols using a first spreading code to obtain a spread plurality of control channel symbols; modulate a plurality of coded bits of the data channel using a second modulation scheme to obtain a plurality of data channel symbols; spread the plurality of data channel symbols using a second spreading code to obtain a spread plurality of data channel symbols; and multiplex the spread plurality of control channel symbols with the spread plurality of data channel symbols to obtain the multiplexed combination of the control channel and the data channel.

Aspect 4: The apparatus of aspect 3, wherein the one or more processors are further configured to: utilize different lengths of the first spreading code and the second spreading code to distinguish the control channel associated with the first spreading code from the data channel associated with the second spreading code.

Aspect 5: The apparatus of any of aspects 1 through 4, wherein the control channel and the data channel are associated with one user and the one or more processors are further configured to: superimpose a spread plurality of control channel symbols and a spread plurality of data channel symbols to obtain the multiplexed combination of the control channel and the data channel, and transmit the multiplexed combination as a single-user superposition transmission, which is different from a multi-user superposition transmission (MUST).

Aspect 6: The apparatus of aspect 5, wherein the apparatus is a user equipment, and the user equipment transmits the single-user superposition transmission in an uplink direction.

Aspect 7: The apparatus of any of aspects 1 through 6, wherein in an uplink direction, the control channel is conveyed in a physical uplink control channel (PUCCH) and the data channel is conveyed in a physical uplink shared channel (PUSCH), and the one or more processors are further configured to: transmit the multiplexed combination of the control channel and the data channel as a superimposition of the PUCCH and the PUSCH on the at least one resource element.

Aspect 8: The apparatus of any of aspects 1 through 7, wherein in a downlink direction, the control channel is conveyed in a physical downlink control channel (PDCCH)

and the data channel is conveyed in a physical downlink shared channel (PDSCH), and the one or more processors are further configured to: transmit the multiplexed combination of the control channel and the data channel as a superimposition of the PDCCH and the PDSCH on the at least one resource element.

Aspect 9: The apparatus of any of aspects 1 through 8, wherein the one or more processors are further configured to: modulate a plurality of coded bits of the control channel using a first modulation scheme to obtain a constellation of control channel symbols; scale the constellation of control channel symbols using a control channel symbol constellation scaling factor to obtain a scaled constellation of control channel symbols; modulate a plurality of coded bits of the data channel using a second modulation scheme to obtain a constellation of data channel symbols; and scale, rotate, or both scale and rotate the constellation of data channel symbols using a data channel symbol constellation adjustment factor having a real part and an imaginary part to obtain a scaled, rotated, or both scaled and rotated constellation of data channel symbols, and multiplex the scaled constellation of control channel symbols and the scaled, rotated, or both scaled and rotated constellation of data channel symbols to obtain the multiplexed combination of the control channel and the data channel.

Aspect 10: The apparatus of aspect 9, wherein the one or more processors are further configured to: utilize a non-zero rotation of the constellation of data channel symbols in response to equal scaling of the constellation of control channel symbols and the constellation of data channel symbols, to distinguish the control channel from the data channel.

Aspect 11: A method at an apparatus, comprising: transmitting a multiplexed combination of a control channel and a data channel, the multiplexed combination mapped to at least one resource element in a time-frequency resource grid.

Aspect 12: The method of aspect 11, wherein the control channel and the data channel are multiplexed at a symbol-level.

Aspect 13: The method of aspect 11 or aspect 12, further comprising: modulating a plurality of coded bits of the control channel using a first modulation scheme to obtain a plurality of control channel symbols; spreading the plurality of control channel symbols using a first spreading code to obtain a spread plurality of control channel symbols; modulating a plurality of coded bits of the data channel using a second modulation scheme to obtain a plurality of data channel symbols; spreading the plurality of data channel symbols using a second spreading code to obtain a spread plurality of data channel symbols; and multiplexing the spread plurality of control channel symbols with the spread plurality of data channel symbols to obtain the multiplexed combination of the control channel and the data channel.

Aspect 14: The method of aspect 13, further comprising: utilizing different lengths of the first spreading code and the second spreading code to distinguish the control channel associated with the first spreading code from the data channel associated with the second spreading code.

Aspect 15: The method of any of aspects 11 through 14, wherein the control channel and the data channel are associated with one user and the method further comprises: superimposing a spread plurality of control channel symbols and a spread plurality of data channel symbols to obtain the multiplexed combination of the control channel and the data channel, and transmitting the multiplexed combination as a single-user superposition transmission, which is different from a multi-user superposition transmission (must).

Aspect 16: The method of aspect 15, wherein the apparatus is a user equipment, and the user equipment transmits the single-user superposition transmission in an uplink direction.

Aspect 17: The method of any of aspects 11 through 16, wherein in an uplink direction, the control channel is conveyed in a physical uplink control channel (PUCCH) and the data channel is conveyed in a physical uplink shared channel (PUSCH), and the method further comprises: transmitting the multiplexed combination of the control channel and the data channel as a superimposition of the PUCCH and the PUSCH on the at least one resource element.

Aspect 18: The method of any of aspects 11 through 17, wherein in a downlink direction, the control channel is conveyed in a physical downlink control channel (PDCCH) and the data channel is conveyed in a physical downlink shared channel (PDSCH), and the method further comprises: transmitting the multiplexed combination of the control channel and the data channel as a superimposition of the PDCCH and the PDSCH on the at least one resource element.

Aspect 19. The method of any of aspects 11 through 18, further comprising: modulating a plurality of coded bits of the control channel using a first modulation scheme to obtain a constellation of control channel symbols; scaling the constellation of control channel symbols using a control channel symbol constellation scaling factor to obtain a scaled constellation of control channel symbols; modulating a plurality of coded bits of the data channel using a second modulation scheme to obtain a constellation of data channel symbols; and scaling, rotating, or both scaling and rotating the constellation of data channel symbols using a data channel symbol constellation adjustment factor having a real part and an imaginary part to obtain a scaled, rotated, or both scaled and rotated constellation of data channel symbols, and multiplexing the scaled constellation of control channel symbols and the scaled, rotated, or both scaled and rotated constellation of data channel symbols to obtain the multiplexed combination of the control channel and the data channel.

Aspect 20: The method of aspect 19, further comprising: utilizing a non-zero rotation of the constellation of data channel symbols in response to equal scaling of the constellation of control channel symbols and the constellation of data channel symbols, to distinguish the control channel from the data channel.

Aspect 21: An apparatus configured for wireless communication comprising at least one means for performing a method of any one of aspects 11 through 20.

Aspect 22: A non-transitory computer-readable medium storing computer-executable code, comprising code for causing an apparatus to perform a method of any one of aspects 11 through 20.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage, or mode of operation. The term “coupled” is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms “circuit” and “circuitry” are used broadly and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-14 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more.

The word “obtain” as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase “means for” or, in the case of a method claim, the element is recited using the phrase “step for.”

As used herein, the term “determine” or “determining” encompasses a wide variety of actions and, therefore, “determining” can include calculating, computing, processing, deriving, investigating, looking up (such as via looking up in a table, a database, or another data structure), inferring, ascertaining, measuring, and the like. Also, “determining” can include receiving (such as receiving information), accessing (such as accessing data stored in memory), transmitting (such as transmitting information) and the like. Also, “determining” can include resolving, selecting, obtaining, choosing, establishing, and other similar actions.

As used herein, a phrase referring to “at least one of” a list of items refers to any combination of those items, including single members. As an example, “at least one of: a, b, or c” is intended to cover: a, b, c, a-b, a-c, b-c, and a-b-c. As used herein, “or” is intended to be interpreted in the inclusive sense, unless otherwise explicitly indicated. For example, “a or b” may include a only, b only, or a combination of a and b. Similarly, a phrase referring to A “and/or” B may include A only, B only, or a combination of A and B.

As used herein, “based on” is intended to be interpreted in the inclusive sense, unless otherwise explicitly indicated. For example, “based on” may be used interchangeably with “based at least in part on,” “associated with,” or “in accordance with” unless otherwise explicitly indicated. Specifically, unless a phrase refers to “based on only ‘a,’” or the equivalent in context, whatever it is that is “based on ‘a,’” or “based at least in part on ‘a,’” may be based on “a” alone or based on a combination of “a” and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus, comprising:

one or more memories; and one or more processors being configured to, individually or collectively, based at least in part on information stored in the one or more memories:

modulate a plurality of coded bits of a control channel using a first modulation scheme to obtain a plurality of control channel symbols;

spread the plurality of control channel symbols using a first spreading code to obtain a spread plurality of control channel symbols;

modulate a plurality of coded bits of a data channel using a second modulation scheme to obtain a plurality of data channel symbols;

spread the plurality of data channel symbols using a second spreading code to obtain a spread plurality of data channel symbols;

utilize different lengths of the first spreading code and the second spreading code to distinguish the control channel associated with the first spreading code from the data channel associated with the second spreading code;

multiplex the spread plurality of control channel symbols with the spread plurality of data channel symbols to obtain a multiplexed combination of the control channel and the data channel; and transmit the multiplexed combination of the control channel and the data channel, the multiplexed combination mapped to at least one resource element in a time-frequency resource grid.

2. The apparatus of claim 1, wherein the control channel and the data channel are multiplexed at a symbol-level.

3. The apparatus of claim 1, wherein the control channel and the data channel are associated with one user and the one or more processors are further configured to:

superimpose the spread plurality of control channel symbols and the spread plurality of data channel symbols to obtain the multiplexed combination of the control channel and the data channel, and transmit the multiplexed combination as a single-user superposition transmission, which is different from a multi-user superposition transmission (MUST).

4. The apparatus of claim 3, wherein the apparatus is a user equipment, and the user equipment transmits the single-user superposition transmission in an uplink direction.

5. The apparatus of claim 1, wherein in an uplink direction, the control channel is conveyed in a physical uplink control channel (PUCCH) and the data channel is conveyed in a physical uplink shared channel (PUSCH), and the one or more processors are further configured to:

transmit the multiplexed combination of the control channel and the data channel as a superimposition of the PUCCH and the PUSCH on the at least one resource element.

6. The apparatus of claim 1, wherein in a downlink direction, the control channel is conveyed in a physical downlink control channel (PDCCH) and the data channel is conveyed in a physical downlink shared channel (PDSCH), and the one or more processors are further configured to:

transmit the multiplexed combination of the control channel and the data channel as a superimposition of the PDCCH and the PDSCH on the at least one resource element.

7. A method at an apparatus, comprising:

modulating a plurality of coded bits of a control channel using a first modulation scheme to obtain a plurality of control channel symbols;

spreading the plurality of control channel symbols using a first spreading code to obtain a spread plurality of control channel symbols;

modulating a plurality of coded bits of a data channel using a second modulation scheme to obtain a plurality of data channel symbols;

spreading the plurality of data channel symbols using a second spreading code to obtain a spread plurality of data channel symbols;

utilizing different lengths of the first spreading code and the second spreading code to distinguish the control channel associated with the first spreading code from the data channel associated with the second spreading code;

multiplexing the spread plurality of control channel symbols with the spread plurality of data channel symbols to obtain a multiplexed combination of the control channel and the data channel; and transmitting the multiplexed combination of the control channel and the data channel, the multiplexed combination mapped to at least one resource element in a time-frequency resource grid.

8. The method of claim 7, wherein the control channel and the data channel are multiplexed at a symbol-level.

9. The method of claim 7, wherein the control channel and the data channel are associated with one user and the method further comprises:

superimposing the spread plurality of control channel symbols and the spread plurality of data channel symbols to obtain the multiplexed combination of the control channel and the data channel, and transmitting the multiplexed combination as a single-user superposition transmission, which is different from a multi-user superposition transmission (MUST).

10. The method of claim 9, wherein the apparatus is a user equipment, and the user equipment transmits the single-user superposition transmission in an uplink direction.

11. The method of claim 7, wherein in an uplink direction, the control channel is conveyed in a physical uplink control channel (PUCCH) and the data channel is conveyed in a physical uplink shared channel (PUSCH), and the method further comprises:

transmitting the multiplexed combination of the control channel and the data channel as a superimposition of the PUCCH and the PUSCH on the at least one resource element.

12. The method of claim 7, wherein in a downlink direction, the control channel is conveyed in a physical downlink control channel (PDCCH) and the data channel is conveyed in a physical downlink shared channel (PDSCH), and the method further comprises:

transmitting the multiplexed combination of the control channel and the data channel as a superimposition of the PDCCH and the PDSCH on the at least one resource element.

* * * * *